US008612223B2

(12) United States Patent
Minamino et al.

(10) Patent No.: US 8,612,223 B2
(45) Date of Patent: Dec. 17, 2013

(54) VOICE PROCESSING DEVICE AND METHOD, AND PROGRAM

(75) Inventors: Katsuki Minamino, Tokyo (JP); Hitoshi Honda, Kanagawa (JP); Yoshinori Maeda, Kanagawa (JP); Hiroaki Ogawa, Chiba (JP)

(73) Assignee: Sony Corporation, Tokyo (JP)

( * ) Notice: Subject to any disclaimer, the term of this patent is extended or adjusted under 35 U.S.C. 154(b) by 449 days.

(21) Appl. No.: 12/817,526

(22) Filed: Jun. 17, 2010

(65) Prior Publication Data

US 2011/0029311 A1 Feb. 3, 2011

(30) Foreign Application Priority Data

Jul. 30, 2009 (JP) ................................. 2009-177578

(51) Int. Cl.
*G10L 15/06* (2013.01)

(52) U.S. Cl.
USPC ........................... 704/243; 704/231; 704/236

(58) Field of Classification Search
USPC ....................................................... 704/243
See application file for complete search history.

(56) References Cited

U.S. PATENT DOCUMENTS

| | | | | | |
|---|---|---|---|---|---|
| 4,783,803 | A | * | 11/1988 | Baker et al. ................... | 704/252 |
| 5,197,005 | A | * | 3/1993 | Shwartz et al. ........................ | 1/1 |
| 5,357,596 | A | * | 10/1994 | Takebayashi et al. ........ | 704/275 |
| 5,377,103 | A | * | 12/1994 | Lamberti et al. .................. | 704/9 |
| 5,386,494 | A | * | 1/1995 | White ........................ | 704/270.1 |
| 5,625,748 | A | * | 4/1997 | McDonough et al. ......... | 704/251 |
| 5,754,978 | A | * | 5/1998 | Perez-Mendez et al. ..... | 704/255 |
| 5,842,163 | A | * | 11/1998 | Weintraub ..................... | 704/240 |
| 6,192,110 | B1 | * | 2/2001 | Abella et al. ................ | 379/88.01 |
| 6,421,645 | B1 | * | 7/2002 | Beigi et al. ..................... | 704/272 |
| 6,526,380 | B1 | * | 2/2003 | Thelen et al. .................. | 704/251 |
| 6,901,399 | B1 | * | 5/2005 | Corston et al. ........................ | 1/1 |
| 6,975,993 | B1 | * | 12/2005 | Keiller ............................ | 704/275 |
| 7,016,835 | B2 | * | 3/2006 | Eide et al. ...................... | 704/231 |
| 7,016,849 | B2 | * | 3/2006 | Arnold et al. .................. | 704/275 |
| 7,184,960 | B2 | * | 2/2007 | Deisher et al. ................ | 704/275 |
| 7,219,056 | B2 | * | 5/2007 | Axelrod et al. ............... | 704/235 |

(Continued)

FOREIGN PATENT DOCUMENTS

JP 2006-53203 2/2006

OTHER PUBLICATIONS

Goldman, Neil "Sentence Paraphrasing from a Conceptual Base," Communications of the ACM USA, vol. 18, No. 2, Feb. 1975, pp. 96-106.*

(Continued)

*Primary Examiner* — Pierre-Louis Desir
*Assistant Examiner* — Fariba Sirjani
(74) *Attorney, Agent, or Firm* — Oblon, Spivak, McClelland, Maier & Neustadt, L.L.P.

(57) ABSTRACT

There is provided a voice processing device. The device includes: score calculation unit configured to calculate a score indicating compatibility of a voice signal input on the basis of an utterance of a user with each of plural pieces of intention information indicating each of a plurality of intentions; intention selection unit configured to select the intention information indicating the intention of the utterance of the user among the plural pieces of intention information on the basis of the score calculated by the score calculation unit; and intention reliability calculation unit configured to calculate the reliability with respect to the intention information selected by the intention selection unit on the basis of the score calculated by the score calculation unit.

12 Claims, 17 Drawing Sheets

(56) References Cited

U.S. PATENT DOCUMENTS

| | | | |
|---|---|---|---|
| 7,228,275 B1* | 6/2007 | Endo et al. | 704/235 |
| 7,245,706 B2* | 7/2007 | Harrison et al. | 379/88.16 |
| 7,251,595 B2* | 7/2007 | Yasuda et al. | 704/9 |
| 7,286,987 B2* | 10/2007 | Roy | 704/270 |
| 7,308,404 B2* | 12/2007 | Venkataraman et al. | 704/255 |
| 7,313,524 B1* | 12/2007 | Minamino | 704/270 |
| 7,330,811 B2* | 2/2008 | Turcato et al. | 704/10 |
| 7,346,507 B1* | 3/2008 | Natarajan et al. | 704/244 |
| 7,401,023 B1* | 7/2008 | Schwartz et al. | 704/275 |
| 7,461,344 B2* | 12/2008 | Young et al. | 715/727 |
| 7,496,500 B2* | 2/2009 | Reed et al. | 704/9 |
| 7,499,892 B2* | 3/2009 | Aoyama et al. | 706/16 |
| 7,502,737 B2* | 3/2009 | Sharma | 704/251 |
| 7,562,014 B1* | 7/2009 | Hakkani-Tur et al. | 704/236 |
| 7,562,082 B2* | 7/2009 | Zhou | 1/1 |
| 7,584,099 B2* | 9/2009 | Ma et al. | 704/240 |
| 7,624,014 B2* | 11/2009 | Stewart et al. | 704/251 |
| 7,653,549 B2* | 1/2010 | Knott et al. | 704/275 |
| 7,716,056 B2* | 5/2010 | Weng et al. | 704/275 |
| 7,739,104 B2* | 6/2010 | Berkan et al. | 704/9 |
| 7,752,051 B2* | 7/2010 | Mizutani et al. | 704/275 |
| 7,805,303 B2* | 9/2010 | Sugihara et al. | 704/257 |
| 7,809,565 B2* | 10/2010 | Coifman | 704/252 |
| 7,937,265 B1* | 5/2011 | Pasca et al. | 704/9 |
| 7,969,174 B2* | 6/2011 | Balog et al. | 324/762.02 |
| 8,005,680 B2* | 8/2011 | Kommer | 704/275 |
| 8,036,890 B2* | 10/2011 | Catchpole | 704/235 |
| 8,095,371 B2* | 1/2012 | Horioka et al. | 704/275 |
| 8,140,328 B2* | 3/2012 | Williams | 704/236 |
| 8,145,494 B2* | 3/2012 | Horioka et al. | 704/275 |
| 8,150,694 B2* | 4/2012 | Kennewick et al. | 704/257 |
| 8,155,968 B2* | 4/2012 | Sugiyama et al. | 704/270 |
| 8,185,397 B2* | 5/2012 | Lee et al. | 704/270 |
| 8,195,683 B2* | 6/2012 | Bolivar | 707/765 |
| 8,219,384 B2* | 7/2012 | Lloyd et al. | 704/8 |
| 8,229,734 B2* | 7/2012 | Bennett | 704/9 |
| 8,249,876 B1* | 8/2012 | Ainslie | 704/270 |
| 8,271,264 B2* | 9/2012 | Gorman et al. | 704/9 |
| 8,275,609 B2* | 9/2012 | Wang | 704/214 |
| 8,364,493 B2* | 1/2013 | Yano | 704/275 |
| 8,374,859 B2* | 2/2013 | Huang et al. | 704/231 |
| 8,380,511 B2* | 2/2013 | Cave et al. | 704/270 |
| 8,396,715 B2* | 3/2013 | Odell et al. | 704/270 |
| 2001/0041978 A1* | 11/2001 | Crespo et al. | 704/257 |
| 2002/0198714 A1* | 12/2002 | Zhou | 704/252 |
| 2003/0055653 A1* | 3/2003 | Ishii et al. | 704/275 |
| 2003/0091163 A1* | 5/2003 | Attwater et al. | 379/88.01 |
| 2003/0182131 A1* | 9/2003 | Arnold et al. | 704/275 |
| 2003/0236664 A1* | 12/2003 | Sharma | 704/251 |
| 2004/0034520 A1* | 2/2004 | Langkilde-Geary et al. | 704/1 |
| 2004/0098265 A1* | 5/2004 | Kelly et al. | 704/270 |
| 2004/0120472 A1* | 6/2004 | Popay et al. | 379/88.01 |
| 2004/0143436 A1* | 7/2004 | Huang et al. | 704/257 |
| 2004/0199375 A1* | 10/2004 | Ehsani et al. | 704/4 |
| 2005/0065789 A1* | 3/2005 | Yacoub et al. | 704/231 |
| 2005/0165607 A1* | 7/2005 | Di Fabbrizio et al. | 704/256 |
| 2005/0182628 A1* | 8/2005 | Choi | 704/252 |
| 2005/0228667 A1* | 10/2005 | Duan et al. | 704/256 |
| 2006/0004575 A1* | 1/2006 | Alshawi et al. | 704/257 |
| 2006/0080098 A1* | 4/2006 | Campbell | 704/243 |
| 2006/0106604 A1* | 5/2006 | Okimoto | 704/243 |
| 2006/0136210 A1* | 6/2006 | Menendez-Pidal et al. | 704/256.8 |
| 2006/0149544 A1* | 7/2006 | Hakkani-Tur et al. | 704/236 |
| 2007/0016401 A1* | 1/2007 | Ehsani et al. | 704/9 |
| 2007/0033038 A1* | 2/2007 | Strong | 704/251 |
| 2008/0177547 A1* | 7/2008 | Yaman et al. | 704/257 |
| 2008/0208590 A1* | 8/2008 | Cross et al. | 704/275 |
| 2008/0221893 A1* | 9/2008 | Kaiser | 704/257 |
| 2008/0243506 A1* | 10/2008 | Sakai et al. | 704/256.4 |
| 2008/0262843 A1* | 10/2008 | Katsuragawa et al. | 704/253 |
| 2009/0030681 A1* | 1/2009 | Sureka et al. | 704/235 |
| 2009/0112605 A1* | 4/2009 | Gupta | 704/275 |
| 2009/0313019 A1* | 12/2009 | Kato et al. | 704/254 |
| 2010/0004930 A1* | 1/2010 | Strope et al. | 704/240 |
| 2010/0013760 A1* | 1/2010 | Hirai et al. | 345/156 |
| 2010/0070277 A1* | 3/2010 | Arakawa et al. | 704/246 |
| 2010/0153112 A1* | 6/2010 | Phillips et al. | 704/257 |
| 2010/0185448 A1* | 7/2010 | Meisel | 704/256.1 |
| 2010/0217592 A1* | 8/2010 | Gupta et al. | 704/236 |
| 2010/0235167 A1* | 9/2010 | Bourdon | 704/231 |
| 2010/0268535 A1* | 10/2010 | Koshinaka | 704/236 |
| 2010/0312546 A1* | 12/2010 | Chang et al. | 704/9 |
| 2011/0029311 A1* | 2/2011 | Minamino et al. | 704/243 |
| 2011/0054894 A1* | 3/2011 | Phillips et al. | 704/235 |
| 2011/0066429 A1* | 3/2011 | Shperling et al. | 704/228 |
| 2012/0041756 A1* | 2/2012 | Hanazawa et al. | 704/9 |

OTHER PUBLICATIONS

Marc A. Zissman, Kay Berkling: Automatic language identification. Speech Communication 35(1-2): 115-124 (2001).*

Ye-Ying Wang, Li Deng, Alex Acero, IEEE Signal Processing Magazine, p. 16, Sep. 2005: "Spoken Language Understanding."*

* cited by examiner

FIG. 5

| INTENTION INFORMATION | ASHITA-NO-TENKI-WO-OSHIETE-KUDASAI (Let me know the weather tomorrow) |
|---|---|
| EXAMPLE SENTENCE | ASHITA NO TENKI WO OSHIETE KUDASAI (Let me know the weather tomorrow) |
| EXAMPLE SENTENCE | ASHITA NO TENKI WA (How's the weather tomorrow) |
| EXAMPLE SENTENCE | ASHITA NO TENKI WO OSHIETE KURERU (Tell me the weather tomorrow) |
| EXAMPLE SENTENCE | E-TO ASHITA NO TENKI GA KIKITAI (Well, I want to know the weather tomorrow) |

FIG. 6

| WORD | PRONUNCIATION |
|---|---|
| E-TO | e-to |
| NO | no |
| HA | wa |
| WO | wo |
| GA | ga |
| ASHITA | ashita |
| TENKI | tenki |
| OSHIETE | oshiete |
| KUDASAI | kudasai |
| KURERU | kureru |
| KIKITAI | kikitai |

FIG. 7

| CONCATENATION WORDS | | | TRIGRAM PROBABILITY |
|---|---|---|---|
| E-TO | ASHITA | NO | 0.003 |
| NO | TENKI | WO | 0.01 |
| NO | TENKI | GA | 0.008 |
| WO | OSHIETE | KUDASAI | 0.007 |
| TENKI | WO | OSHIETE | 0.009 |
| TENKI | GA | KIKITAI | 0.007 |
| ⋮ | ⋮ | ⋮ | ⋮ |
| ASHITA | NO | TENKI | 0.009 |

FIG. 8

| CONCATENATION WORDS | | BIGRAM PROBABILITY | BIGRAM BACK-OFF COEFFICIENT |
|---|---|---|---|
| E-TO | ASHITA | 0.02 | 0.01 |
| NO | TENKI | 0.1 | 0.02 |
| WO | OSHIETE | 0.08 | 0.02 |
| GA | KIKITAI | 0.07 | 0.01 |
| TENKI | WO | 0.09 | 0.02 |
| TENKI | GA | 0.07 | 0.01 |
| ⋮ | ⋮ | ⋮ | ⋮ |
| OSHIETE | KUDASAI | 0.09 | 0.01 |

FIG. 9

| WORD | UNIGRAM PROBABILITY | UNIGRAM BACK-OFF COEFFICIENT |
|---|---|---|
| E-TO | 0.04 | 0.02 |
| NO | 0.1 | 0.06 |
| WA | 0.08 | 0.04 |
| WO | 0.09 | 0.04 |
| GA | 0.06 | 0.03 |
| TENKI | 0.2 | 0.08 |
| ⋮ | ⋮ | ⋮ |
| KIKITAI | 0.1 | 0.09 |

FIG. 10

| INTENTION INFORMATION | IMA-NO-JIKAN-WO-OSHIETE-KUDASAI (Can you tell me the time, please?) |
|---|---|
| EXAMPLE SENTENCE | IMA NANJI DESU KA (Can you tell me the time?) |
| EXAMPLE SENTENCE | IMA NANJI (What time is it?) |
| EXAMPLE SENTENCE | IMA NANJI KANA (Do you know what time it is?) |
| EXAMPLE SENTENCE | IMA NO JIKAN GA KIKITAI (I want to know the time) |
| EXAMPLE SENTENCE | JIKAN WO OSHIETE (Tell me the time) |

| WORD | PRONUNCIATION |
|---|---|
| IMA | ima |
| DESU | desu |
| KA | ka |
| KANA | kana |
| NO | no |
| GA | ga |
| WO | wo |
| NANJI | nanji |
| KIKITAI | kikitai |
| OSHIETE | oshiete |

| WORD | ACOUSTIC SCORE | LANGUAGE SCORE | | PRE-SCORE |
|---|---|---|---|---|
| ASHITA | $P_{A1}$ | $Q_{A1}$ | | $R_A$ |
| NO | $P_{A2}$ | $Q_{A2}$ | | |
| TENKI | $P_{A3}$ | $Q_{A3}$ | | |
| OSHIETE | $P_{A4}$ | $Q_{A4}$ | | |

FIG. 16

| WORD | STARTING TIME | ENDING TIME |
|---|---|---|
| silence | t1 | t2 |
| ASHITA | t2 | t3 |
| NO | t3 | t4 |
| TENKI | t4 | t5 |
| OSHIETE | t5 | t6 |
| silence | t6 | t7 |

VOICE PROCESSING DEVICE AND METHOD, AND PROGRAM

BACKGROUND OF THE INVENTION

1. Field of the Invention

The present invention relates to a voice processing device and a voice processing method, and a program, and more particularly, to a voice processing device and a voice processing method, and a program which are capable of reliably estimating correct intention from an input voice.

2. Description of the Related Art

In recent years, there has been developed a variety of products or services to which voice recognition is applied. The voice recognition refers to a technique for recognizing a word sequence corresponding to an input voice, using appearance probability or the like of a feature amount indicating acoustic features.

FIG. 1 is a block diagram illustrating a configuration example of a voice recognition device in the related art using the voice recognition.

A voice recognition device 1 in FIG. 1 includes an input section 21, an AD converting section 22, a feature extraction section 23, a matching section 24, an acoustic model database 25, a dictionary database 26 and a grammar database 27.

A voice based on an utterance of a user is input to the input section 21 which includes a microphone or the like. The input section 21 converts the input voice into a voice signal which is an analog electric signal for output.

The AD converting section 22 converts the analog input voice signal which is output from the input section 21 into a digital input voice signal for output, through sampling and quantization.

The feature extraction section 23 frequency-analyzes the input voice signal which is output from the AD converting section 22 at an appropriate time interval, to thereby extract parameters indicating a spectrum or other acoustic features of the voice. The parameters extracted in this way correspond to a feature amount of the input voice signal. A time sequence of the feature amount of the input voice signal (hereinafter, referred to as a feature amount sequence) is output from the feature extraction section 23.

The feature extraction section 23 extracts the feature amount sequence of the input voice signal in this way, and determines a voice zone of the input voice signal. The voice zone represents a zone ranging from a starting time of the utterance to an ending time thereof.

The matching section 24 determines a word sequence which is the most compatible with the feature amount sequence extracted by the feature extraction section 23, and outputs the determined word sequence as a voice recognition result. Hereinafter, the process thus performed by the matching section 24 is referred as a matching process. The matching section 24 performs the matching process with respect to the voice zone which is determined by the feature extraction section 23 and thereby sequentially output the voice recognition results for all the voice zones.

In this respect, when performing the matching process, the matching section 24 uses the acoustic model database 25, the dictionary database 26 and the grammar database 27.

The acoustic model database 25 records therein an acoustic model indicating an acoustic feature for each predetermined unit such as an individual phoneme or a syllable in a language of the voice which is a recognition target. As the acoustic model, for example, an HMM (Hidden Markov Model) can be employed.

The dictionary database 26 records therein a dictionary which describes information (hereinafter, referred to as pronunciation information) about pronunciation of each word of the voice which is the recognition target. Thus, each word and the acoustic model are related to each other. As a result, an acoustic standard pattern is obtained corresponding to each word which is recorded in the dictionary database 26.

The grammar database 27 records therein a grammar rule which describes how respective words recorded in the dictionary database 26 can be concatenated. As the grammar rule, for example, a regular grammar, a context-free grammar, or an N-gram grammar including a statistical word concatenation probability can be employed.

For example, in a case where the HMM is employed as the acoustic model in the acoustic model database 25, the matching section 24 accumulates the appearance probability of the feature amount according to the feature amount sequence which is extracted by the feature extraction section 23. That is, since the appearance probability of the feature amount of each word is accumulated using the above described standard pattern, an acoustic evaluation value (hereinafter, referred to as an acoustic score) is calculated for each word.

Further, for example, in a case where a bigram is employed as the grammar rule in the grammar database 27, the matching section 24 calculates linguistic possibility for each word on the basis of the concatenation probability with respect to the preceding word. This linguistic possibility of each word is digitized as a linguistic evaluation value (hereinafter, referred to as a language score).

The matching section 24 determines a word sequence which is the most compatible with the input voice supplied to the input section 21, on the basis of a final evaluation value (hereinafter, referred to as a total score) which is obtained by totally evaluating the acoustic score and the language score with respect to each word. The determined word sequence is output as a voice recognition result.

For example, in a case where a user makes an utterance "KYO-WA-II-TENKI-DESUNE (It is nice weather today)", a word sequence of "KYO", "WA", "II", "TENKI" and "DESUNE" is output as the voice recognition result. When such a word sequence is determined, as described above, the acoustic score and the language score are given to each word.

In a case where such a voice recognition device is applied to a robot, an operation of the robot should be related to the word sequence which is recognized according to the voice recognition. As techniques for realizing this relation, there are the following first and second techniques.

The first technique is a technique in which a word sequence is recognized according to the voice recognition and a corresponding operation is directly related to the recognized word sequence. For example, in a case where a user makes an utterance "TATTE (Stand up)", the robot can be controlled so as to perform an operation corresponding to the word sequence "TATTE" which is recognized according to the voice recognition, that is, controlled to stand up.

The second technique is a technique in which a user's intention implied in the utterance is extracted from the word sequence which is recognized according to the voice recognition, and a corresponding operation is related to this intention. According to the second technique, for example, with respect to utterances such as "TATTE (Up)", "OKITE (Get up)", "TACHIAGATTE (Stand up)" which are uttered to the robot by a user, the respective utterances are recognized according to the voice recognition. Since intention (for example, "TATTE-KUDASAI (Please stand up)" in this case), implied in the respective utterances recognized in this way is estimated, the robot can be controlled so as to perform an operation (for example, a stand up operation in this case) corresponding to the intention.

In general, while one operation corresponds to one intention, a plurality of utterances exists corresponding to one intention. Thus, according to the first technique, since one operation should correspond to one word sequence, the same operation should correspond to a plurality of word sequences which corresponds to one intention, respectively. On the other hand, according to the second technique, one operation has to correspond to one intention which corresponds to the plurality of word sequences. Accordingly, as the technique for relating the operation to the word sequence which is recognized according to the voice recognition, the second technique is more appropriate than the first technique.

In order to realize such a second technique, a device is employed which is configured to estimate the user's intention implied in the utterance from the word sequence recognized according to the voice recognition. Hereinafter, such a device is referred to as a voice understanding device.

In order to estimate the user's intention implied in an utterance, a voice understanding device in the related art determines a word sequence which is compatible with an input voice signal based on the utterance, on the basis of a word dictionary corresponding to intention information indicating one intention and a grammar rule. Such a word sequence is determined with respect to each of the plural pieces of intention information. Then, this voice understanding device calculates the similarity between the determined word sequence and an input voice signal with respect to each of the plural pieces of intention information. Specifically, an acoustic score indicating an acoustic similarity and a language score indicating a language similarity are calculated as values indicating the similarity, with respect to each of the plural pieces of intention information. Then, the voice understanding device of the related art estimates intention which corresponds to the input voice signal among the plural pieces of intention information using the two scores (for example, refer to Japanese Unexamined Patent Application Publication No. 2006-53203).

SUMMARY OF THE INVENTION

However, the voice understanding device in the related art using the voice recognition may mistakenly estimate intention. Thus, if the robot performs an operation corresponding to such intention information, the operation is recognized as an unintended mistaken operation to a user.

Accordingly, it is desirable to provide a technique which is capable of reliably estimating correct intention from an input voice.

According to an embodiment of the prevent invention, there is provided a voice processing device including: score calculation means for calculating a score indicating compatibility of a voice signal input on the basis of an utterance of a user with each of plural pieces of intention information indicating each of a plurality of intentions; intention selection means for selecting the intention information indicating the intention of the utterance of the user among the plural pieces of intention information on the basis of the score calculated by the score calculation means; and intention reliability calculation means for calculating the reliability of the intention information selected by the intention selection means on the basis of the score calculated by the score calculation means.

The score calculation means may include acoustic score calculation means for calculating an acoustic score as the score indicating an acoustic compatibility of the voice signal with intention information, for each of the plural pieces of intention information; language score calculation means for calculating a language score as the score indicating a language compatibility of the voice signal with intention information for each of the plural pieces of intention information; and pre-score calculation means for calculating a pre-score as the score determined in advance on the basis of occurrence probability for each of the plural pieces of intention information.

The pre-score calculation means may adjust the pre-score for each of the plural pieces of intention information in response to a context at the time when the voice signal is input.

The score calculation means may calculate the score of a voice zone in the voice signal.

The score calculation means may further calculate the score of the intention information which does not indicate a specific intention among the plural pieces of intention information, and the intention selection means may determine, in a case where the intention information which does not indicate the specific intention is selected, that the utterance of the user corresponding to the voice signal is a meaningless utterance which does not indicate a specific intention.

The score calculation means may give a weight to each of the acoustic score, the language score and the pre-score; and the intention reliability calculation means may adjust each weight and calculate the reliability on the basis of the scores each given the adjusted weight.

The voice processing device may further include management means for managing an output based on the intention information selected by the intention selection means.

According to other embodiments of the present invention, there are provided a voice processing method and a program which correspond to the above described voice processing device according to the embodiment of the present invention.

The voice processing method and the program according to the other embodiments of the present invention include the steps of: calculating a score indicating compatibility of a voice signal input on the basis of an utterance of a user with each of plural pieces of intention information indicating each of a plurality of intentions; selecting the intention information indicating the intention of the utterance of the user among the plural pieces of intention information on the basis of the calculated score; and calculating the reliability of the selected intention information on the basis of the calculated score.

As described above, according to the embodiments of the invention, it is possible to reliably estimate correct intention from the input voice.

BRIEF DESCRIPTION OF THE DRAWINGS

FIG. 5 is a diagram illustrating an example of intention information;

FIG. 6 is a diagram illustrating an example of a dictionary recorded in a dictionary database;

FIG. 7 is a diagram illustrating an example of a trigram table;

FIG. 8 is a diagram illustrating an example of a bigram table;

FIG. 9 is a diagram illustrating an example of a unigram table;

FIG. 10 is a diagram illustrating an example of intention information;

FIG. 16 is a diagram illustrating a starting time and an ending time with respect to each word;

DESCRIPTION OF THE PREFERRED EMBODIMENTS

Five embodiments (hereinafter, referred to as first to fifth embodiments) of a voice understanding device according to the present invention will be described hereinafter. Description thereof will be made in the following order.

1. First embodiment
2. Second embodiment (an example in which a context is used for adjustment of a pre-score)
3. Third embodiment (an application example of a silent zone removal)
4. Fourth embodiment (an application example of a meaningless utterance determination)
5. Fifth embodiment (an application example of a voice understanding result)

1. First Embodiment

Figure 1:
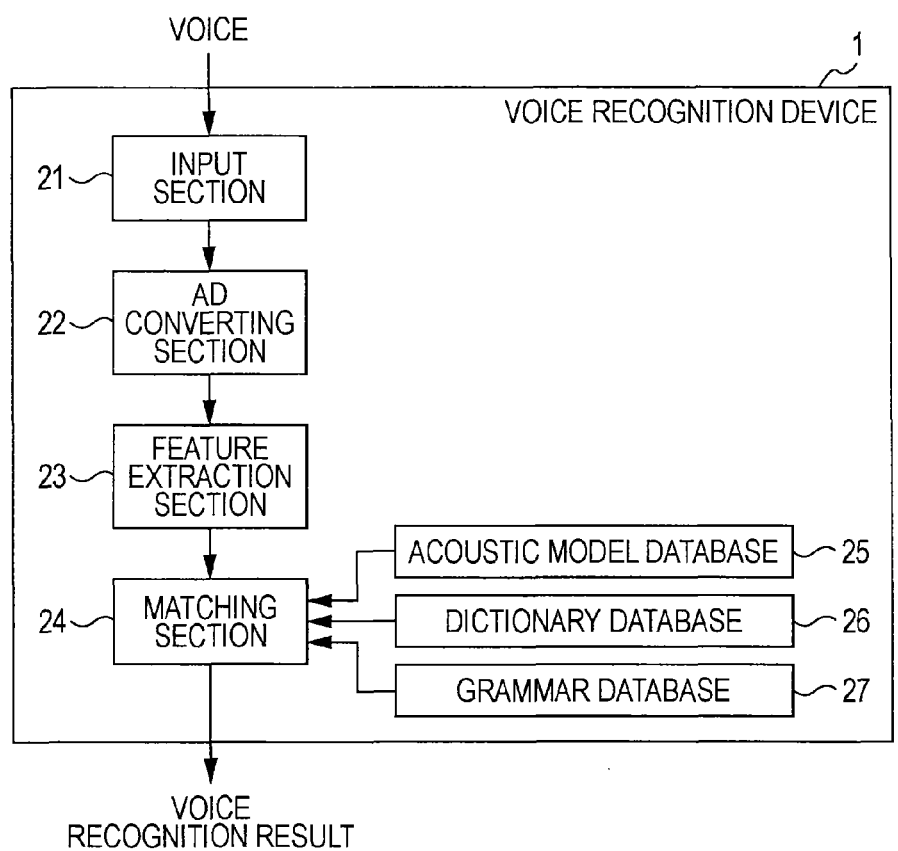
FIG. 1 is a block diagram illustrating a configuration example of a voice recognition device in the related art.
Figure 2:
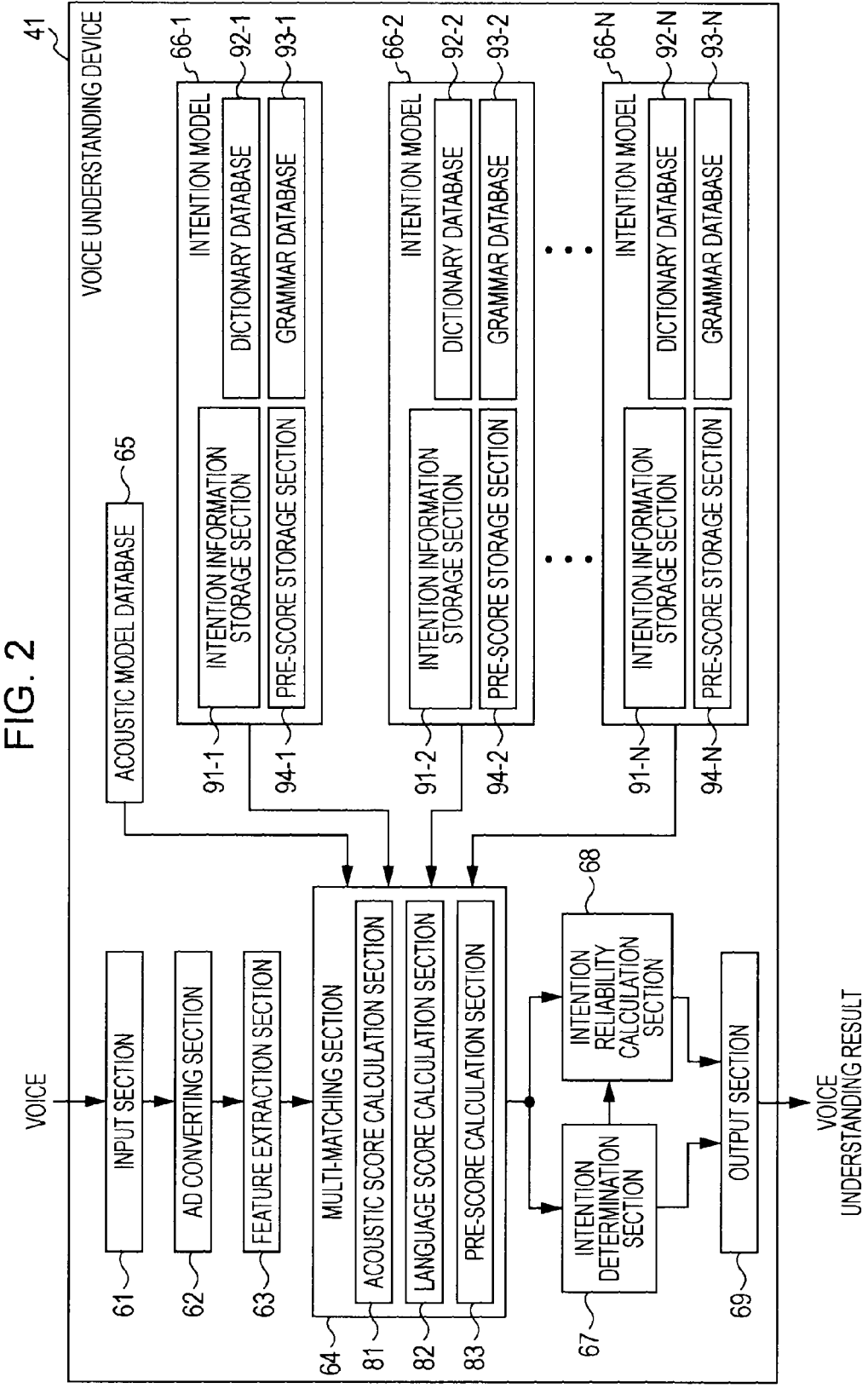
FIG. 2 is a block diagram illustrating a configuration example of a voice understanding device according to an embodiment of the present invention.

Configuration Example of a Voice Understanding Device According to the Present Invention FIG. 2 is a block diagram illustrating a configuration example according to an embodiment of a voice understanding device as a voice processing device according to the present invention.

A voice understanding device 41 in FIG. 2 includes an input section 61, an AD converting section 62, a feature extraction section 63, a multi-matching section 64, an acoustic model database 65, intention models 66-1 to 66-N, an intention determination section 67, an intention reliability calculation section 68 and an output section 69.

A voice based on an utterance of a user is input to the input section 61 which includes a microphone or the like. The input section 61 converts the input voice into a voice signal which is an analog electric signal for output. Hereinafter, the voice signal output from the input section 61 is referred to as an input voice signal.

The AD converting section 62 converts the analog input voice signal which is output from the input section 61 into a digital input voice signal for output, through sampling and quantization.

The feature extraction section 63 frequency-analyzes the input voice signal which is output from the AD converting section 62 at an appropriate time interval, to thereby extract parameters indicating a spectrum or other acoustic features of the voice. The parameters extracted in this way correspond to a feature amount of the input voice signal. A time sequence of the feature amount of the input voice signal (hereinafter, referred to as a feature amount sequence) is output from the feature extraction section 63.

The feature extraction section 63 extracts the feature amount sequence of the input voice signal in this way, and determines a voice zone of the input voice signal. The voice zone represents a zone ranging from a starting time of the utterance to an ending time thereof. For example, the feature extraction section 63 extracts only the zone of the utterance on the basis of power or the like of the input voice signal, to thereby detect the voice zone.

The acoustic model database 65 records therein an acoustic model indicating an acoustic feature for each predetermined unit such as an individual phoneme or a syllable in a language of the voice which is a recognition target. As the acoustic model, for example, an HMM (Hidden Markov Model) can be employed.

The intention model 66-$k$ ($k$ is an arbitrary integer value of 1 to N) includes an intention information storage section 91-$k$, a dictionary database 92-$k$, a grammar database 93-$k$, and a pre-score storage section 94-$k$.

Information indicating intention corresponding to the intention model 66-$k$ (hereinafter, referred to as intention information) is stored in the intention information storage section 91-$k$.

A dictionary in which information about pronunciation for each word of the voice which is the recognition target (hereinafter, referred to as utterance information) is described, which is provided with words defined according to the intention information stored in the intention information storage section 91-$k$, is recorded in the dictionary database 92-$k$. Accordingly, each word is related to the acoustic model. As a result, an acoustic standard pattern corresponding to each word recorded in the dictionary database 92-$k$ is obtained.

A predetermined grammar rule such as a bigram grammar or a trigram grammar which gives concatenation probability of respective words which are recorded in the dictionary database 92-$k$ is recorded in the grammar database 93-$k$. In particular, the grammar rule recorded in the grammar database 93-$k$ is configured so that a score value is given to a word sequence indicating the intention information which is stored in the intention information storage section 91-$k$.

The score value which is given in advance with respect to the intention model 66-$k$ (hereinafter, referred to as the pre-score value) is stored in the pre-score storage section 94-$k$.

The multi-matching section 64 for calculating a score indicating compatibility with respect to the intention information of the input voice signal includes an acoustic score calculation section 81, a language score calculation section 82 and a pre-score calculation section 83.

The multi-matching section 64 uses one intention model 66-$k$ together with the acoustic model database 65, and determines a word sequence which is the most compatible with the feature amount sequence (input voice signal) which is extracted by the feature extraction section 63. That is, among word sequences which can be formed using words defined with respect to the intention (intention indicated by the intention information) corresponding to one intention model 66-*k*, a word sequence which is the most compatible with the input voice signal is determined. In the multi-matching section 64, the word sequence which is the most compatible with the input voice signal for each of the plurality of intention models 66-1 to 66-N is determined.

Further, in the multi-matching section 64, with respect to the word sequence (word sequence which is formed using words defined with respect to the corresponding intention) which is determined the most compatible with the input voice signal for each of the plurality of intention models 66-1 to 66-N, an acoustic score and a language score are calculated. The acoustic score is calculated by the acoustic score calculation section 81, and the language score is calculated by the language score calculation section 82.

Specifically, the acoustic score calculation section 81 calculates probability (appearance probability) that the feature amount sequence is observed from a word model included in the word sequence which is determined by the multi-matching section 64 with respect to one intention model 66-*k*, and calculates the acoustic score for each word on the basis of the appearance probability.

The language score calculation section 82 calculates concatenation (adjacency) probability of the words included in the word sequence which is determined by the multi-matching section 64 with respect to one intention model 66-*k*, and calculates the language score for each word on the basis of the probability.

Respective processes of the acoustic score calculation section 81 and the language score calculation section 82 are performed for each of the plurality of intention models 66-1 to 66-N. As a result, in the multi-matching section 64, with respect to the word sequence which is determined for each of the plurality of intention models 66-1 to 66-N, the acoustic score and the language score are calculated for each word.

Further, the pre-score calculation section 83 calculates the pre-score with respect to each of the plurality of intention models 66-1 to 66-N.

The pre-score is a value which is determined in advance on the basis of occurrence probability of one piece of intention information, as described above, and is stored in the pre-score storage section 94-*k* of the intention model 66-*k* corresponding to one piece of intention information. That is, the pre-score calculation section 83 calculates the pre-score with respect to the intention information corresponding to the intention model 66-*k*, on the basis of a context from the pre-score which is stored in the pre-score storage section 94-*k* of the intention model 66-*k* corresponding to one piece of intention information. In a case where all the intentions occur with the same probability, the same score values are calculated as the pre-scores.

Hereinafter, the series of processes according to the multi-matching section 64 as described above is referred to as a multi-matching process.

That is, as a result of the multi-matching process, the acoustic score, the language score, and the pre-score are calculated for each of the plurality of intention models 66-1 to 66-N, and are provided to the intention determination section 67 and the intention reliability calculation section 68.

The intention determination section 67 calculates a total score which is obtained by totally evaluating the acoustic score, the language score and the pre-score which are provided from the multi-matching section 64, with respect to one intention model 66-K. Such a total score is calculated for each of the plurality of intention models 66-1 to 66-N. Thus, the intention determination section 67 selects intention information corresponding to the intention model 66-*t* (t is any integer of 1 to N) having the highest total score among the total scores, as intention information corresponding to the utterance of a user. In this way, the total score is used for estimating the intention corresponding to the utterance of the user.

The intention reliability calculation section 68 calculates the reliability on the basis of the acoustic score, the language score and the pre-score which are provided from the multi-matching section 64, with respect to the intention model 66-*t* which is selected by the intention determination section 67.

The output section 69 outputs the information which is given the reliability calculated by the intention reliability calculation section 68 with respect to the intention model 66-*t* corresponding to the intention information, with respect to the intention information selected by the intention determination section 67, as the voice understanding result.

[Voice Understanding Process]

Figure 3:
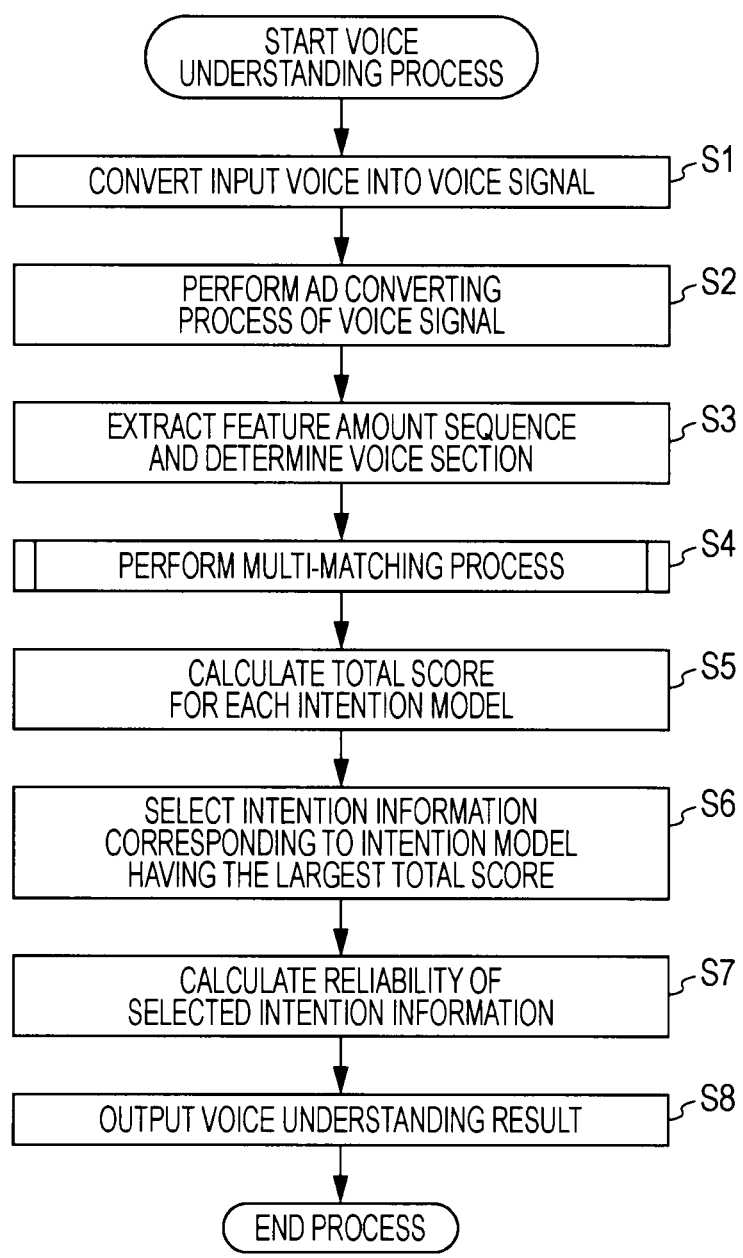
FIG. 3 is a flowchart illustrating an example of a voice understanding process.

FIG. 3 is a flowchart illustrating an example of a voice understanding process according to the voice understanding device 41.

In step S1, the input section 61 converts an input voice into a voice signal. That is, the voice uttered by a user is input and is output as an analog input voice signal.

In step S2, the AD converting section 62 performs an AD converting process with respect to the voice signal. That is, the analog input voice signal is AD-converted, and a digital input voice signal obtained as the result is output.

In step S3, the feature extraction section 63 extracts a feature amount sequence from the input voice signal and determines a voice zone.

In step S4, the multi-matching section 64 which is the score calculation means performs a multi-matching process with respect to the extracted feature amount sequence.

Here, a detailed example of the multi-matching process will be described.

Figure 4:
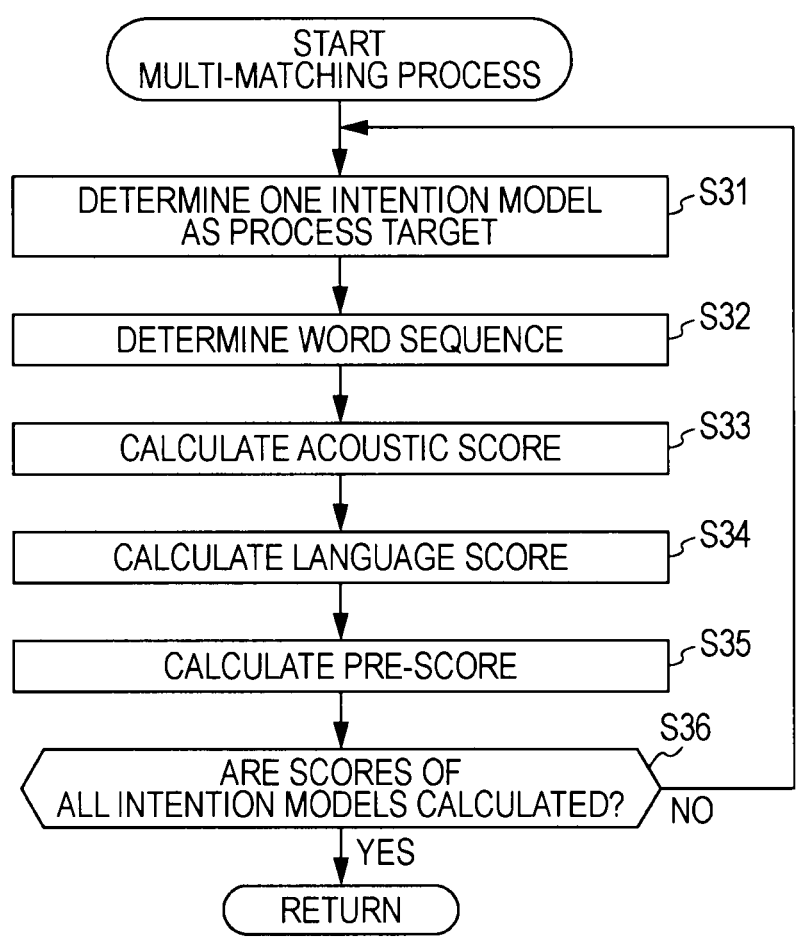
FIG. 4 is a flowchart illustrating an example of a multi-matching process.

FIG. 4 is a flowchart illustrating an example of the multi-matching process.

In step S31, the multi-matching section 64 determines one intention model 66-*k* as a process target, among the plurality of intention models 66-1 to 66-N.

In step S32, the multi-matching section 64 determines a word sequence which is the most compatible with the feature amount sequence (input voice signal) which is extracted by the feature extraction section 63.

In this case, the dictionary database 92-*k* and the grammar database 93-*k*, which are included in the intention model 66-*k*, are used together with the acoustic model database 65. Hereinafter, the dictionary database 92-*k* and the grammar database 93-*k* will be described.

A dictionary which is generated on the basis of example sentences corresponding to the intention information stored in the intention information storage section 91-*k* and which describes pronunciation information about each word is recorded in the dictionary database 92-*k*. A grammar rule which is generated on the basis of the example sentences corresponding to the intention information stored in the intention information storage section 91-*k* and which describes the pronunciation information about each word, is recorded in the grammar database 93-*k*.

In this respect, specifically, with reference to FIGS. 5 to 9, an example of intention information which is applied to the intention model 66-1 (K=1), and respective examples of a dictionary and a grammar rule which are generated on the basis of example sentences corresponding to the intention information will be described. Next, with reference to FIGS. 10 and 11, an example of intention information which is applied to the intention model 66-2 (K=2), and an example of a dictionary which is generated on the basis of example sentences corresponding to the intention information will be described.

FIG. 5 is a diagram illustrating an example of intention information which is applied to the intention model 66-1 and example sentences corresponding to the example.

For example, intention information indicating intention of an utterance "ASHITA-NO-TENKI-WO-OSHIETE-KUDA-SAI (Let me know the weather tomorrow)", as shown in FIG. 5, is stored in an intention information storage section 91-1 of the intention model 66-1. In this case, a dictionary recorded in a dictionary database 92-1 and a grammar rule recorded in a grammar database 93-1 are generated on the basis of the four example sentences shown in FIG. 5. That is, on the basis of the example sentences corresponding to the intention information, that is, "ASHITA NO TENKI WO OSHIETE KUDA-SAI (Let me know the weather tomorrow)", "ASHITA NO TENKI WA (How's the weather tomorrow?)", "ASHITA NO TENKI WO OSHIETE KURERU (Tell me the weather tomorrow?)" and "E-TO ASHITA NO TENKI GA KIKITAI (Well, I want to know the weather tomorrow)", the dictionary and the grammar rule are generated. Further, each example sentence has the words which are separated from each other by space.

A dictionary as shown in FIG. 6 is generated on the basis of each example sentence in FIG. 5, and is recorded in the dictionary database 92-1.

FIG. 6 is a diagram illustrating an example of the dictionary recorded in the dictionary database 92-1.

The dictionary as shown in FIG. 6 includes items of "word" and "pronunciation".

In the "word" item, all the words included in the four example sentences as shown in FIG. 5 are described in respective rows thereof. In the "pronunciation" item, pronunciation information corresponding to the word described in the "word" item of the same row is recorded.

The pronunciation information described in the "pronunciation" item corresponds to information for relating each word recorded in the dictionary database 92-1 to the acoustic model database 65. For example, in a case where the HMM is employed as the acoustic model in the unit of a syllable, by relating the acoustic model database 65 to each word on the basis of the corresponding pronunciation information, an acoustic standard pattern corresponding to each word is obtained. This can be equivalently applied to dictionaries which are capable of being recorded in all dictionary databases 92-2 to 92-N, in addition to the dictionary database 92-1.

Hereinafter, in order to differentiate words and pronunciation information, in a case where "AAA" indicates the word, it is described as a word "AAA", and in a case where "AAA" indicates the pronunciation information, it is described as pronunciation information "aaa".

Specifically, for example, in the first row, the word "E-TO (well)" is described in the "word" item, and the pronunciation information "e-to" corresponding to the word "E-TO" is described in the "pronunciation" item. For example, in the sixth row, the word "ASHITA (tomorrow)" is described in the "word" item, and the pronunciation information "ashita" corresponding to the word "ASHITA (tomorrow)" is described in the "pronunciation" item. Similarly, in the case of the other rows, the predetermined words are described in the "word" item, and pronunciation information corresponding to the predetermined words is described in the "pronunciation" item.

Further, for example, a model (N-gram grammar) of the occurrence probability or the concatenation probability of the respective words (the respective words included in the dictionary in FIG. 6) included in the respective example sentences in FIG. 5 is generated as the grammar rule, and then is recorded in a grammar database 93-1.

The concatenation probability of three words is referred to as a trigram probability, the concatenation probability of two words is referred to as a bigram probability, and the occurrence probability of each word is referred to as a unigram probability. Further, a table indicating a model of the trigram probability is referred to as a trigram table, a table indicating a model of the bigram probability is referred to as a bigram table, and a table indicating a model of the unigram probability is referred to as a unigram table.

Specifically, for example, as the grammar rule, the trigram table, the bigram table and the unigram table as shown in FIGS. 7 to 9 are recorded in the grammar database 93-1.

FIG. 7 is a diagram illustrating an example of the trigram table recorded in the grammar database 93-1.

The trigram table as shown in FIG. 7 includes items of "concatenated words" and "trigram probability".

Predetermined three concatenated words are described in respective rows in a concatenation order in the "concatenated words" item, among all the words included in the four example sentences as shown in FIG. 5. The probability that three words described in the "concatenated words" item in the same row are arranged in the order, that is, the trigram probability is described in the "trigram probability" item.

Specifically, for example, in the first row, the word "E-TO (well)", the word "ASHITA (tomorrow)", and the word "NO" are described in the "concatenated words" item. In the "trigram probability" item, "0.003" is described. Accordingly, from the description of the first row, it could be seen that the trigram probability that the word "E-TO", the word "ASHITA" and the word "NO" are concatenated in the order, that is, the probability that the three words are concatenated to form a segment "E-TO ASHITA NO" becomes "0.003".

For example, in the second row, the word "NO", the word "TENKI (weather)" and the word "WO" are described in the "concatenated words" item. In the "trigram probability" item, "0.01" is described. Accordingly, from the description of the second row, it could be seen that the trigram probability that the word "NO", the word "TENKI", and the word "WO" are concatenated in the order, that is, the probability that the three words are concatenated to form a segment "NO TENKI WO" becomes "0.01".

Similarly, in the case of the other rows, the predetermined three words are described in the "concatenated words" item, and the trigram probability that the predetermined three words are concatenated is described in the "trigram probability" item.

The trigram probability with respect to three words which are not shown in FIG. 7 can be calculated by multiplying a bigram back-off coefficient of initial two words by bigram probability of the last two words among the three words, with reference to the bigram table in FIG. 8 which will be described later.

FIG. 8 is a diagram illustrating an example of the bigram table recorded in the grammar database 93-1.

The bigram table as shown in FIG. 8 includes items of "concatenated words", "bigram probability" and "bigram back-off coefficient".

Among all the words included in the four example sentences as shown in FIG. 5, the predetermined two concatenated words are described in respective rows in a concatenated order in the "concatenated words" item. The probability that two words described in the "concatenated words" item in the same row are arranged in the order, that is, the bigram probability is described in the "bigram probability" item. The bigram back-off coefficient with respect to the two words which are described in the "concatenated words" item in the same row is described in the "bigram back-off coefficient" item. The bigram back-off coefficient refers to a coefficient which is used for a case where the trigram probability is calculated on the basis of the bigram probability, so as to prevent the total of the probabilities from exceeding 1.

Specifically, for example, in the first row, the word "E-TO (well)", the word "ASHITA (tomorrow)" are described in the "concatenated words" item. In the "bigram probability" item, "0.02" is described. In the "bigram back-off coefficient" item, "0.01" is described. Accordingly, from the description of the first row, it could be seen that the bigram probability that the word "E-TO (well)" and the word "ASHITA (tomorrow)" are concatenated in the order, that is, the probability that the two words are concatenated to form a segment "E-TO ASHITA (well tomorrow)" becomes "0.02".

For example, in the second row, the word "NO" and the word "TENKI (weather)" are described in the "concatenated words" item. In the "bigram probability" item, "0.1" is described. In the "bigram back-off coefficient" item, "0.02" is described. Accordingly, from the description of the second row, it could be seen that the bigram probability that the word "NO" and the word "TENKI" are concatenated in the order, that is, the probability that the two words are concatenated to form a segment "NO TENKI" becomes "0.1".

The bigram probability with respect to two words which are not shown in FIG. 8 can be calculated by multiplying a unigram back-off coefficient of the former word among the two words by unigram probability of the latter word thereof, with reference to a unigram table in FIG. 9 which will be described later.

FIG. 9 is a diagram illustrating an example of the unigram table recorded in the grammar database 93-1.

The unigram table as shown in FIG. 9 includes items of "word", "unigram probability" and "unigram back-off coefficient".

All the words included in the four example sentences as shown in FIG. 5 are described in the "word" item, respectively. The probability that a word described in the "word" item in the same row is arranged in a segment, that is, the unigram probability is described in the "unigram probability" item. The unigram back-off coefficient with respect to the word which is written in the "word" item in the same row is described in the "unigram back-off coefficient" item. The unigram back-off coefficient refers to a coefficient which is used for a case where the bigram probability is calculated on the basis of the unigram probability, so as to prevent the total of the probabilities from exceeding 1.

Specifically, for example, in the first row, the word "E-TO (well)" is described in the "word" item. In the "unigram probability" item, "0.04" is described. In the "unigram back-off coefficient" item, "0.02" is described. Accordingly, from the description of the first row, it could be seen that the unigram probability that the word "E-TO" is arranged in the segment becomes "0.04".

As a process with respect to a word having a low appearance frequency, a technique for correcting each of the probability values, for example, by means of smoothing, and specifically, for example, a linear interpolation technique, a technique which is referred to as back-off smoothing, may be employed.

Further, with respect to a calculation technique and the smoothing technique of the unigram probability, the bigram probability, and the trigram probability, for example, details thereof are disclosed in "Approach on the basis of voice language process-corpus", written by Kenji Kita, Tetsu Nakamura, Morikita Publishing Co., Ltd.

As described above with reference to FIGS. 5 to 9, in this specific example, with respect to the intention model 66-1, the intention in FIG. 5 is stored in the intention information storage section 91-1. Further, the dictionary and the grammar rule are generated on the basis of the respective example sentences in FIG. 5. The dictionary is recorded in the dictionary database 92-1, and the grammar rule is recorded in the grammar database 93-1.

FIG. 10 is a diagram illustrating an example of the intention information which is applied to the intention model 66-2, and example sentences corresponding to the intention information.

For example, it is assumed that intention information indicating intention of an utterance "IMA-NO-JIKAN-WO-OSHIETE-KUDASAI (Can you tell me the time, please?)" as shown in FIG. 10 is stored in the intention information storage section 91-2 of the intention model 66-2. In this case, a dictionary recorded in the dictionary database 92-2 and a grammar rule recorded in the grammar database 93-2 are generated on the basis of five example sentences as shown in FIG. 10. That is, the dictionary and the grammar rule are generated on the basis of the example sentences "IMA NANJI DESU KA (Can you tell me the time?)", "IMA NANJI (What time is it?)", "IMA NANJI KANA (Do you know what time it is?), "IMA NO JIKAN GA KIKITAI" (I want to know the time) and "JIKAN WO OSHIETE (Tell me the time)" corresponding to the intention information. Further, each example sentence has the words which are separated from each other by space.

Figures 11, 12:
FIG. 11 is a diagram illustrating an example of a dictionary recorded in a dictionary database.
FIG. 12 is a diagram illustrating a performance result of a multi-matching process.

Specifically, for example, a dictionary as shown in FIG. 11 is generated on the basis of the respective example sentences as shown in FIG. 10, and is recorded in the dictionary database 92-2.

FIG. 11 is a diagram illustrating an example of the dictionary recorded in the dictionary database 92-2.

The dictionary as shown in FIG. 11 includes items of "word" and "pronunciation", in a similar way to the dictionary in FIG. 6.

In the "word" item, all the words which are included in the five example sentences as shown in FIG. 10 are described in respective rows. In the "pronunciation" item, pronunciation information corresponding to the words described in the "word" item of the same row is described.

Specifically, for example, in the first row, the word "IMA" is described in the "word" item, and the pronunciation information "ima" corresponding to the word "IMA" is described in the "pronunciation" item. For example, in the second row, the word "DESU" is described in the "word" item, and the pronunciation information "desu" corresponding to the word "DESU" is described in the "pronunciation" item. Similarly, in the case of the other rows, the predetermined words are described in the "word" item, and pronunciation information corresponding to the predetermined words is described in the "pronunciation" item.

Further, for example, a model (N-gram grammar) of the occurrence probability or the concatenation probability of the respective words (the respective words included in the dictionary in FIG. 11) included in the respective example sentences in FIG. 10 is generated as a grammar rule, and then the generated grammar rule is recorded in a grammar database 93-2. Specifically, for example, although not shown, a trigram table, a bigram table, and a unigram table having the same configurations as those shown in FIGS. 7 to 9 are recorded in the grammar database 93-2, as the grammar rule.

In this way, in this specific example, the dictionary in FIG. 6 and the grammar rule (trigram grammar or the like) in FIGS. 7 to 9 are provided corresponding to the intention information "ASHITA-NO-TENKI-WO-OSHIETE-KUDASAI (Let me know the weather tomorrow)" as shown in FIG. 5. Further, the dictionary in FIG. 6 is recorded in the dictionary database 92-1, and the grammar rule (trigram grammar or the like) in FIGS. 7 to 9 is recorded in the grammar database 93-1. With respect to the dictionary database 92-1 and the grammar database 93-1, a model obtained by combining the intention information storage section 91-1 in which the intention information in FIG. 5 is stored, and a pre-score storage section 94-1 in which a pre-score is stored corresponds to the intention model 66-1.

Similarly, in this specific example, a dictionary in FIG. 11 and a grammar rule (trigram grammar or the like) which is not shown are provided with respect to the intention information "IMA-NO-JIKAN-WO-OSHIETE-KUDASAI (Can you tell me the time, please?)" as shown in FIG. 10. Further, the dictionary in FIG. 11 is recorded in the dictionary database 92-2, and the grammar rule (trigram grammar or the like) which is not shown is recorded in the grammar database 93-2. With respect to the dictionary database 92-2 and the grammar database 93-2, a model obtained by combining the intention information storage section 91-2 in which the intention information in FIG. 10 is stored with a pre-score storage section 94-2 in which a pre-score is stored is the intention model 66-2.

Similarly, in the other cases, for example, the intention models 66-3 to 66-N each are provided corresponding to a variety of intention information such as "KONNICHIWA (Good afternoon)", "RAJIO-WO-TUKETE (Turn on the radio)" or "MO-SUKOSHI-MAE-NI-KITE (Come near a little more)", one to one.

Accordingly, in a case where the intention model 66-1 is determined as the process target in the process in step S31 as shown in FIG. 4, the following process is performed in the process of step S32. That is, by means of the acoustic model database 65, the dictionary database 92-1 in which the dictionary as shown in FIG. 6 is recorded, and the grammar database 93-1 in which the grammar rules as shown in FIGS. 7 to 9 are recorded, a word sequence corresponding to the intention information "ASHITA-NO-TENKI-WO-OSHIETE-KUDASAI (Let me know the weather tomorrow)" is determined. Specifically, for example, in a case where an utterance of a user is "ASHITA-NO-TENKI-WO-OSHIETE (tell me the weather tomorrow)", a word sequence "ASHITA NO TENKI OSHIETE" is determined with respect to the intention model 66-1.

On the other hand, in a case where the intention model 66-2 is determined as the process target in the process in step S31, the following process is performed in the process in step S32. That is, by means of the acoustic model database 65, the dictionary database 92-2 in which the dictionary as shown in FIG. 11 is recorded, and the grammar database 93-2 in which the grammar rule which is not shown is recorded, a word sequence corresponding to the intention information "IMA-NO-JIKAN-WO-OSHIETE-KUDASAI (Can you tell me the time, please?)" is determined. Specifically, for example, in a case where an utterance of a user is "IMA-NO-JIKAN-WO-OSHIETE (Can you tell me the time?)", a word sequence "OSHIETE NO NANJI OSHIETE" is determined with respect to the intention model 66-2.

In this way, if the word sequence with respect the intention model 66-$k$ of the process target is determined in the process in step S32 as shown in FIG. 4, the procedure goes to step S33.

In step S33, an acoustic score calculation section 81 calculates an acoustic score on the basis of the appearance probability of the feature amount sequence for each word included in the word sequence which is determined with respect to the intention model 66-$k$ of the process target.

In step S34, the language score calculation section 82 calculates a language score on the basis of the concatenation probability for the respective words included in the word sequence which is determined with respect to the intention model 66-$k$ of the process target.

In the processes in steps S33 and S34, a weight coefficient is given with respect to each of the acoustic score and the language score, or a penalty score at the time when a specific word is inserted in the word sequence which is determined with respect to the intention model 66-$k$ of the process target is given. The weight coefficient and the penalty score will be described later.

Further, in the processes in steps S33 and S34, the calculation techniques of the acoustic score and the language score is not particularly limited, for example, as described above, the same technique as the technique which is widely used in the voice recognition process in the related art can be employed.

In step S35, the pre-score calculation section 83 calculates a pre-score with respect to the intention model 66-$k$ of the process target on the basis of the pre-score stored in the pre-score storage section 94-$k$.

In step S36, the multi-matching section 64 determines whether the scores of all the intention models 66-1 to 66-N are calculated.

Among the intention models 66-1 to 66-N, in a case where any model which is not determined as the process target is present, it is determined as "NO" in step S36, and then, the procedure returns to S31 to repeat the same processes. That is, in step S31, the intention model 66-$k$ which is not yet determined as the process target is determined as a new process target. Then, in the processes in steps S32 to S35, a word sequence with respect to the new process target is determined, the acoustic score and the language score with respect to the word sequence are calculated, and the pre-score with respect to the new process target is also calculated.

Thereafter, each of all the intention models 66-1 to 66-N is determined as the process target, and the loop processes of steps S31 to S36 are repeatedly performed. Thus, the word sequence corresponding to the corresponding intention information is determined for each of the intention models 66-1 to 66-N, the acoustic score and the language score with respect to the word sequence are calculated, and the pre-score is calculated. Accordingly, it is determined as "YES" in step S36, the multi-matching process is completed.

When such a multi-matching process is completed, the information which is output from the multi-matching section 64 will be described.

Figure 13:
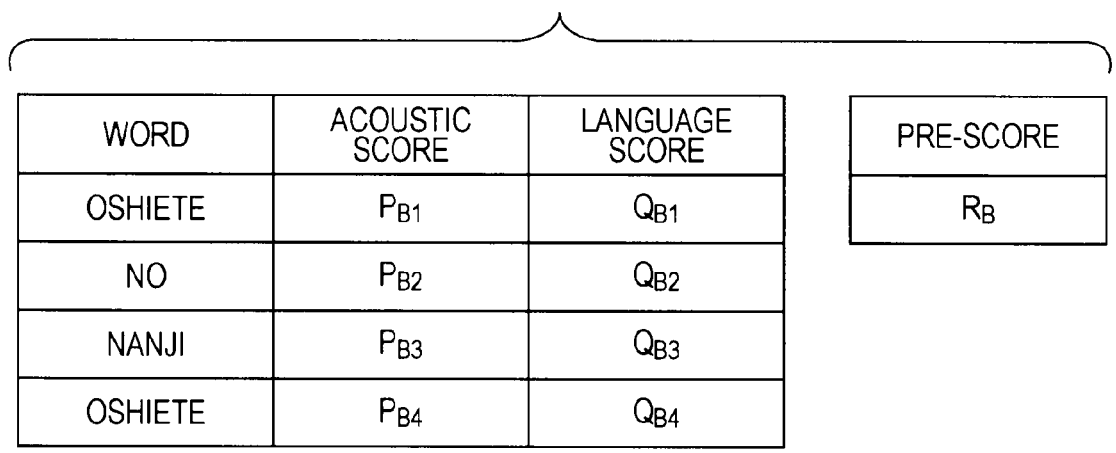
FIG. 13 is a diagram illustrating a performance result of a multi-matching process.

FIGS. 12 and 13 are diagrams illustrating an example of part of the information output from the multi-matching section 64.

FIG. 12 is a diagram illustrating a performance result of a multi-matching process with respect to the intention model 66-1, among the information output from the multi-matching section 64.

In the above described specific example, in the case where the utterance of the user is "ASHITA-NO-TENKI-WO-OSHIETE (tell me the weather tomorrow)", the intention model 66-1 in the process of step S31 in FIG. 4 which is the multi-matching process is determined as the process target, and the word sequence "ASHITA NO TENKI OSHIETE" is determined with respect to the intention model 66-1 in the process of step S32.

In this case, as shown in FIG. 12, acoustic scores $P_{A1}$ to $P_{A4}$ in the process of step S33 are respectively calculated with respect to the respective words "ASHITA", "NO", "TENKI" and "OSHIETE" which form the word sequence. Further, language scores $Q_{A1}$ to $Q_{A4}$ are respectively calculated in the process of step S34. In addition, in the process of step S35, a pre-score $R_A$ is calculated with respect to the intention information of the intention model 66-1.

In this way, in a case where the multi-matching process is performed with respect to one intention model 66-1, as the performance result of the multi-matching process with respect to the intention model 66-1, the following information is output from the multi-matching process 64. That is, the three scores (acoustic score, language score, and pre-score) with respect to the respective words of the word sequence as shown in FIG. 12 correspond to the intention information as shown in FIG. 5 as the performance result information, and are output from the multi-matching section 64.

FIG. 13 is a diagram illustrating a performance result of the multi-matching process with respect to the intention model 66-2 among information output from the multi-matching section 64.

In the above described specific example, in a case where the utterance of the user is "IMA-NO-JIKAN-WO-OSHIETE (Can you tell me the time?)", the intention model 66-2 in the process in step S31 of the multi-matching process is determined as the process target, and the word sequence "OSHIETE NO NANJI OSHIETE" is determined with respect to the intention model 66-2 in the process of step S32.

In this case, as shown in FIG. 13, with respect to the respective words "OSHIETE", "NO", "NANJI" and "OSHIETE" which form the word sequence, acoustic scores $P_{B1}$ to $P_{B4}$ in the process in step S33 are respectively calculated, and language scores s $Q_{B1}$ to $Q_{B4}$ are respectively calculated in the process of step S34. Further, a pre-score $R_B$ is calculated with respect to the intention information of the intention model 66-2, in the process in step S35.

In this way, in a case where the multi-matching process is performed with respect to one intention model 66-2, as a performance result of the multi-matching process with respect to the intention model 66-2, the following information is output from the multi-matching process 64. That is, the three scores (acoustic score, language score, and pre-score) with respect to the respective words of the word sequence as shown in FIG. 13 correspond to the intention information as shown in FIG. 10, and are output from the multi-matching section 64.

Although not shown, as a performance result of the multi-matching process of each of the other intention models 66-3 to 66-N, the same information is output from the multi-matching section 64. That is, the three scores (acoustic score, language score, and pre-score) with respect to the respective words of the word sequence determined according to the corresponding intention information correspond to the corresponding intention information as the performance result information, and are output from the multi-matching section 64, respectively.

Returning to the description in the flowchart in FIG. 3, after the multi-matching process of step S4 and above, in step S5, the intention determination section 67 which is the intention selection means calculates the total score for each of the plurality of intention models 66-1 to 66-N.

For example, the total score of the intention model 66-1 will be calculated as follows.

As shown in FIG. 12, the three scores (acoustic score, language score, and pre-score) with respect to the respective words of the word sequence determined according to the intention information of the intention model 66-1 are the acoustic scores $P_{A1}$ to $P_{A4}$, the language scores $Q_{A1}$ to $Q_{A4}$, and the pre-score $R_A$, as shown in FIG. 12.

In this case, the intention determination section 67 can calculate a total score T1 of the intention model 66-1, according to the following Formula 1.

$$T1 = (P_{A1} P_{A2} P_{A3} P_{A4}) \cdot (Q_{A1} Q_{A2} Q_{A3} Q_{A4}) \cdot R_A \tag{1}$$

Further, for example, the total score of the intention model 66-2 can be calculated as follows.

The three scores (acoustic score, language score, and pre-score) with respect to the respective words of the word sequence determined according to the intention information of the intention model 66-2 are the acoustic scores $P_{B1}$ to $P_{B4}$, the language scores $Q_{B1}$ to $Q_{B4}$, and the pre-score $R_B$, as shown in FIG. 13.

In this case, the intention determination section 67 can calculate a total score T2 of the intention model 66-2, according to the following Formula 2.

$$T2 = (P_{B1} P_{B2} P_{B3} P_{B4}) \cdot (Q_{B1} Q_{B2} Q_{B3} Q_{B4}) \cdot R_B \tag{2}$$

In step S6, the intention determination section 67 selects intention information corresponding to the intention model 66-$t$ having a total score Tt which is the largest among the intention models 66-1 to 66-N. Further, at this time, the intention determination section 67 may select plural pieces of intention information corresponding to the plurality of upper intention models 66 which is larger than a threshold and in which the total scores are preset, among the intention models 66-1 to 66-N.

In step S7, the intention reliability calculation section 68 calculates the reliability of the intention information selected by the intention determination section 67. In step S6, in the case where the plural pieces of intention information is selected by the intention determination section 67, the intention reliability calculation section 68 calculates the reliability of the selected plural pieces of intention information.

In this way, since the reliability of the selected intention information is calculated, intention information having a low reliability can be rejected, and only intention information having a high reliability can be employed. Accordingly, correct intention can be reliably estimated.

For example, only two intention models of the intention model 66-1 and the intention model 66-2 (N=2) are provided in the voice understanding device 41. In this case, as described above, the output information of the multi-matching section 64 includes a set of the information in FIG. 12 and the intention information in FIG. 5, and a set of information in FIG. 13 and the intention information in FIG. 10.

In such a case, the intention reliability calculation section 68 calculates reliability R1 of the intention model 66-1 according to the following Formula 3.

$$R1 = \frac{(P_{A1}P_{A2}P_{A3}P_{A4})^a \cdot (Q_{A1}Q_{A2}Q_{A3}Q_{A4})^b \cdot (R_A)^c}{(P_{A1}P_{A2}P_{A3}P_{A4})^a \cdot (Q_{A1}Q_{A2}Q_{A3}Q_{A4})^b \cdot (R_A)^c + (P_{B1}P_{B2}P_{B3}P_{B4})^a \cdot (Q_{B1}Q_{B2}Q_{B3}Q_{B4})^b \cdot (R_B)^c} \quad (3)$$

In the Formula 3, the respective parameters a, b and c represent parameters for adjusting weights of the acoustic score, the language score and the pre-scores, that is, weight coefficients. The weight coefficients a, b and c are appropriately set for adjusting ratios of the respective scores. For example, in the present embodiment, as described above, the weight coefficients a, b and c are given at the time when each of the acoustic score, the language score, and the pre-score is calculated in the multi-matching process in FIG. 4. However, the weight coefficients a, b and c are not fixed to the given values, and can be adjustable. For example, in the present embodiment, such a function for adjusting the weights of the scores is provided in the intention reliability calculation section 68.

In step S8, the output section 69 outputs the intention information selected by the intention determination section 67, and the reliability of the intention model 66 corresponding to the intention information, as a voice understanding result.

For example, in the above described specific example in which only the intention model 66-1 and the intention model 66-2 are provided in the voice understanding device 41, the total score T1 of the intention model 66-1 is higher than the total score T2 of the intention model 66-2. This means that the intention model 66-1 is compatible with the input voice signal, compared with the intention model 66-2. That is, with respect to the utterance of the user "ASHITA-NO-TENKI-WO-OSHIETE (Tell me the weather tomorrow)", the intention information (FIG. 5) "ASHITA-NO-TENKI-WO-OSHIETE-KUDASAI (Let me know the weather tomorrow)" of the intention model 66-1 is more suitable than the intention information (FIG. 10) "IMA-NO-JIKAN-WO-OSHIETE-KUDASAI (Can you tell me the time, please?)" of the intention model 66-2.

Accordingly, in a case where the utterance of the user is "ASHITA-NO-TENKI-WO-OSHIETE (Tell me the weather tomorrow)", in the process of step S6, the intention information "ASHITA-NO TENKI-WO-OSHIETE-KUDASAI (Let me know the weather tomorrow)" of the intention model 66-1 is selected by the intention determination section 67. Further, in the process of step S7, the intention information "ASHITA-NO-TENKI-WO-OSHIETE-KUDASAI (Let me know the weather tomorrow)" of the intention model 66-1 and the reliability of the intention model 66-1 calculated according to the Formula 3 in the process in step S7 are together output as the voice understanding information.

In the above description, two models of the intention model 66-1 and the intention model 66-2 are present, as described above, but the invention is not limited thereto. In a case where the intention models 66-1 to 66-N (N=3 or more) are present, the voice understanding process is performed in the same way.

Further, in the above described voice understanding process, the intention model 66-$t$ having the highest total score as the voice understanding result is selected. However, only the intention model 66-$t$ should not necessarily be selected. That is, for example, among the intention models 66-1 to 66-N, P items of upper models having high total scores can be selected as the voice understanding result.

Hereinbefore, the example of the voice understanding process by means of the voice understanding device 41 is described, with reference to FIGS. 3 to 13.

In this way, in the voice understanding process by means of the voice understanding device 41, as well as the voice recognition for simply estimating the word sequence from the input voice signal as in the related art, the voice understanding for estimating the intention of the utterance from the input voice signal is also employed.

It should be noted that voice understanding and voice recognition are totally different from each other. Hereinafter, the difference between voice understanding and voice recognition will be described.

In the voice understanding, the occurrence probability of utterance intention which is used for estimating the utterance intention from the input voice signal can be expressed as a post-probability of intention S with respect to an input voice signal X, like the following Formula 4.

$$P(S \mid X) = \frac{P(X \mid S)P(S)}{P(X)} \quad (4)$$

On the other hand, in the voice recognition, the occurrence probability of a word sequence which is used for estimating the word sequence from the input voice signal can be expressed as the following formula 5.

$$P(w_1, w_2, \ldots, w_n \mid X) = \frac{P(X \mid w_1, w_2, \ldots, w_Q)P(w_1, w_2, \ldots, w_Q)}{P(X)} \quad (5)$$

In the Formula 4 and the Formula 5, a variable X represents an input voice signal; a variable S represents intention; a variable $w_i$ (i=1, ..., Q) represents a word. Here, Q represents the number of the words included in the word sequence.

The voice understanding is formulated to determine the intention S in which the occurrence probability as shown in the Formula 4 is maximized. On the other hand, the voice recognition is formulated to determine the word sequence ($w_1$, $w_2$, ..., $w_Q$) in which the occurrence probability as shown in the Formula 5 is maximized.

The acoustic score in the voice recognition corresponds to a probability P(X|$w_1$, $w_2$, ..., $w_Q$), and the language score corresponds to a probability P($w_1$, $w_2$, ..., $w_Q$).

With respect to the voice understanding device 41 as shown in FIG. 2, the Formula 4 can be expressed as the following Formula 6.

$$P(S \mid X) = \frac{P(X \mid w_{s1}, w_{s2}, \ldots, w_{sQ})P(w_{s1}, w_{s2}, \ldots, w_{sQ} \mid S)P(S)}{P(X)} \quad (6)$$

Here, $w_{si}$ (i=1, ..., Q) represents words determined with respect to the intention S. That is, on the basis of a word sequence ($w_{s1}$, $w_{s2}$, ..., $w_{sQ}$) including the words determined with respect to the intention S, the acoustic score is calculated. The acoustic score calculated in this way corresponds to a probability P(X|$W_{S1}$, $w_{S2}$, ..., $W_{SQ}$). Further, on the basis of the word sequence ($w_{S1}$, $w_{S2}$, ..., $w_{SQ}$), the language score is calculated. The language score calculated as described above corresponds to a probability P($w_{S1}$, $w_{S2}$, ..., $w_{SQ}$|S).

Further, the occurrence probability P(s) (pre-score probability) given to the intention S corresponds to the pre-score.

As can be easily understood by comparing the Formula 5 with the Formula 6, in the voice recognition for determining the word sequence $(w_1, w_2, \ldots, w_Q)$ for maximizing the Formula 5, the intention S is not wholly considered. In this respect, in the voice understanding for determining the intention S for maximizing the Formula 6, the word sequence $(w_{S1}, w_{S2}, \ldots, w_{SQ})$ is determined according to the intention S. Accordingly, the N best word sequence which is the voice recognition result determined in the process for calculating the word sequence for maximizing the Formula 5, and a word sequence which is formed for each intention calculated in the voice understanding are totally different from each other. That is, the acoustic score $P(X|w_{S1}, w_{S2}, \ldots, w_{SQ})$ and the language score $P(w_{S1}, w_{S2}, \ldots, w_{SQ}|S)$ calculated in the voice understanding process are totally different from the acoustic score $P(X|w_1, w_2, \ldots, w_Q)$ and the language score $P(w_1, w_2, \ldots, w_Q)$ calculated in the voice recognition process. Further, the voice recognition is also different from the voice understanding in that the pre-score P(S) is considered in the process of calculating the total score.

In the voice understanding device 41, the reliability can be expressed as the Formula 7.

$$P(S \mid X) = \frac{P(X \mid w_{s1}, w_{s2}, \ldots, w_{sQ})^a P(w_{s1}, w_{s2}, \ldots, w_{sQ} \mid S)^b P(S)^c}{\sum_s P(X \mid w_{s1}, w_{s2}, \ldots, w_{sQ})^a P(w_{s1}, w_{s2}, \ldots, w_{sQ} \mid S)^b P(S)^c} \quad (7)$$

In the Formula 7, the parameters a, b and c in the Formula 7 represent parameters for adjusting weights of the acoustic score, the language score, and the pre-score for each of the intention models 66-1 to 66-N which are calculated in the voice understanding, respectively, that is, weight coefficients. In the Formula 7, it could be understood that the reliability is calculated as the post-probability of the intention S with respect to the input voice signal X while taking into account the intention. Further, the Formula 3 is obtained by changing the formula 7 into a formula for calculating the reliability R1 of the intention model 66-1. That is, the Formula 7 is obtained by generalizing the Formula 3.

2. Second Embodiment

In the above described first embodiment, the pre-score stored in each of the intention models 66-1 to 66-N is set on the basis of the occurrence probability (pre-probability) of the corresponding intention, and maintains a fixed value. In this respect, in the second embodiment, the pre-score is adjusted according to a context. The context refers to a state in which an utterance of a user is input.

In this respect, a configuration of a voice understanding device 41 according to the second embodiment is the same as in the first embodiment as shown in FIG. 2.

[State Transition of Context]

For example, in a case where a user can ask the voice understanding device 41 a question about the weather, in an initial context, the occurrence probability that the user makes an utterance "TENKI-WO-OSHIETE (Tell me the weather)" and the occurrence probability that the user makes an utterance "ASHITA (tomorrow)" are approximately the same. Further, the user makes the utterance "TENKI-WO-OSHIETE (Tell me the weather)" with respect to the voice understanding device 41, and with respect to this user's utterance, the voice understanding device 41 gives a response to the user to input date and time. In this context (a state in which the next utterance of the user is input corresponding to the response), it is expected that the occurrence probability that the user repeats the utterance "TENKI-WO-OSHIETE (Tell me the weather)" is low, and the occurrence probability that the user makes an utterance, for example, "ASHITA (tomorrow)" is high. In this way, according to an utterance history of the user, the responses of the voice understanding device 41 with respect to the utterances of the user, and the like, the next context (a state in which the next utterance of the user is input to the voice understanding device 41) is varied.

Figure 14:
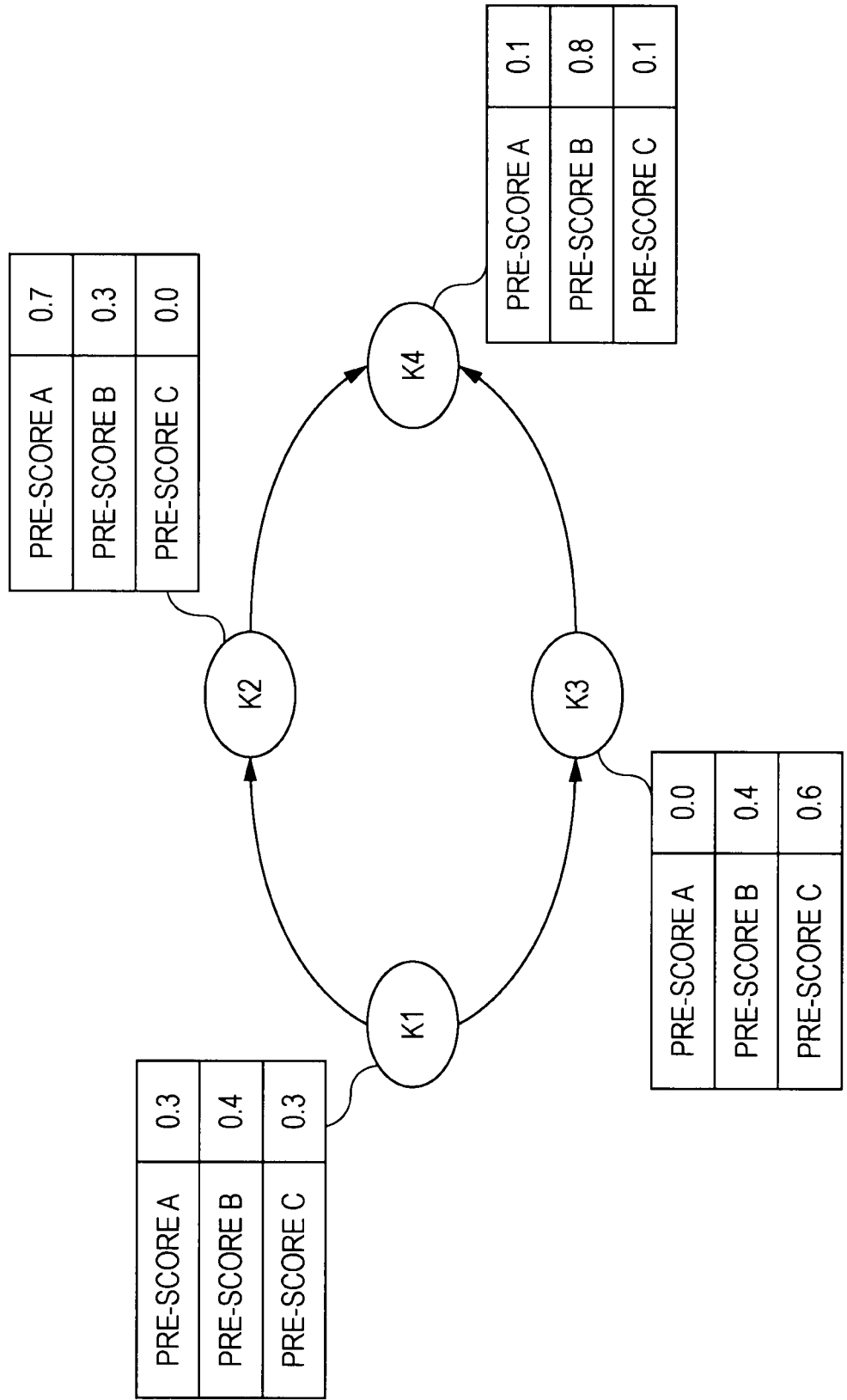
FIG. 14 is a state transition diagram illustrating an example of a state transition of a context.

For example, the context can be expressed by means of a state transition model, as shown in FIG. 14.

FIG. 14 is a state transition diagram illustrating an example of a state transition of the context.

In FIG. 14, states K1 to K4 are represented as ellipses in which corresponding codes are given. Among the states K1 to K4, the state transition from a first state to a second state is indicated by an arrow drawn from the first state to the second state. That is, in the state transition model in FIG. 14, the states K1 to K4 illustrate predetermined contexts. Accordingly, hereinafter, the states K1 to K4 are referred to as contexts K1 to K4. Further, among the contexts K1 to K4, a condition that the state transition from one context to another context occurs (hereinafter, referred to as a state transition condition) is an utterance of a user. Thus, since an initial state of the context is a context K1, if the utterance of the user is performed in the context K1 in the initial state, the context K1 is transited to a context K2 or a context K3.

Specifically, for example, the following three intention models 66-A to 66-C are provided in the voice understanding device 41. Codes A to C in the intention models 66-A to 66-C are certain values among 1 to N, which indicate different values. The intention model 66-A is an intention model corresponding to the intention information A "ASHITA-NO-TENKI-WO-OSHIETE-KUDASAI (Let me know the weather tomorrow)"; the intention model 66-B is an intention model corresponding to the intention information B "RISETTO-SHITE-KUDASAI (Please reset)"; and the intention model 66-C is an intention model corresponding to the intention information C "IMA-NO-JIKAN-WO-OSHIETE-KUDASAI (Can you tell me the time, please?)".

Further, pre-scores A to C corresponding to each of the intention information A to C are adjusted according to each of the contexts K1 to K4 as shown in FIG. 14.

In this respect, a state transition condition from the context K1 in the initial state to the context K2 is an utterance corresponding to the intention information C "IMA-NO-JIKAN-WO-OSHIETE-KUDASAI (Can you tell me the time, please?)". Further, a state transition condition from the context K1 in the initial state to the context K3 is an utterance corresponding to the intention information A "ASHITA-NO-TENKI-WO-OSHIETE-KUDASAI (Let me know the weather tomorrow)".

A state transition condition from the context K2 to the context K4 is an utterance corresponding to the intention information A "ASHITA-NO-TENKI-WO-OSHIETE-KUDASAI (Let me know the weather tomorrow)". Further, a state transition condition from the context K3 to the context K4 is an utterance corresponding to the intention information C "IMA-NO-JIKAN-WO-OSHIETE-KUDASAI (Can you tell me the time, please?)". Further, in a case where a user makes an utterance corresponding to the intention information B "RISETTO-SHITE-KUDASAI (Please reset)" with respect to the voice understanding device 41, transition to the context K1 is performed on a constant basis, which is not shown.

In the context K1 in the initial state, the pre-scores corresponding to the three pieces of intention information A, B and C are adjusted to be similar values 0.3, 0.4 and 0.3. In this respect, the reason why only the pre-score corresponding to the intention information B is 0.4 which is higher than the others is because a total value of the pre-scores corresponding to the three pieces of intention information A, B and C in the present embodiment is normalized to be 1.0, and 1.0 cannot be divided by 3 (=the number of the intention information A, B and C). Thus, the pre-scores of the intention information A or C may be set as 0.4.

In the context K1, in a case where the user makes an utterance corresponding to the intention information C "IMA-NO-JIKAN-WO-OSHIETE-KUDASAI (Can you tell me the time, please?)", the voice understanding device 41 determines that the state transition condition is satisfied by the input utterance, and performs transition from the context K1 to the context K2. As a result, the pre-score calculation section 83 (FIG. 2) of the voice understanding device 41 adjusts the pre-scores corresponding to the intention information A, B and C to 0.7, 0.3 and 0.0, respectively.

That is, in a case where the voice understanding device 41 presents current time information in response to the intention information C to the user, the probability that the user again makes the utterance corresponding to the intention information C "IMA-NO-JIKAN-WO-OSHIETE-KUDASAI (Can you tell me the time, please?)" becomes low. Thus, in the context K2, the pre-score corresponding to the intention information C is adjusted to be decreased to 0.0. On the other hand, the probability that the user again makes the utterance corresponding to the intention information A "ASHITA-NO-TENKI-WO-OSHIETE-KUDASAI (Let me know the weather tomorrow)" becomes high. Thus, in the context K2, the pre-score corresponding to the intention information A is adjusted to be increased to 0.7. Further, in the context K2, the pre-score corresponding to the intention information B is adjusted to 0.3 (=1.0−0.7−0.0).

Similarly, in the context K1, in the case where the user makes an utterance corresponding to the intention information A "ASHITA-NO-TENKI-WO-OSHIETE-KUDASAI (Let me know the weather tomorrow)", the voice understanding device 41 determines that the state transition condition is satisfied by the input utterance, and performs transition from the context K1 to the context K3. As a result, the pre-score calculation section 83 (FIG. 2) of the voice understanding device 41 adjusts the pre-scores corresponding to the intention information A, B and C to 0.0, 0.4 and 0.6, respectively.

That is, in the case where the voice understanding device 41 presents tomorrow weather information in response to the intention information A to the user, the probability that the user again makes the utterance corresponding to the intention information A "ASHITA-NO-TENKI-WO-OSHIETE-KUDASAI (Let me know the weather tomorrow)" becomes low. Thus, in the context K3, the pre-score corresponding to the intention information A is adjusted to be decreased to 0.0. On the other hand, the probability that the user again makes the utterance corresponding to the intention information C "IMA-NO-JIKAN-WO-OSHIETE-KUDASAI (Can you tell me the time, please?)" becomes high. Thus, in the context K3, the pre-score corresponding to the intention information C is adjusted to be increased to 0.6. Further, in the context K3, the pre-score corresponding to the intention information B is adjusted to 0.4 (=1.0−0.6−0.0).

Next, in the context K2, in a case where the user makes an utterance corresponding to the intention information A "ASHITA-NO-TENKI-WO-OSHIETE-KUDASAI (Let me know the weather tomorrow)", the voice understanding device 41 determines that the state transition condition is satisfied by the input utterance, and performs transition from the context K2 to the context K4. As a result, the pre-score calculation section 83 (FIG. 2) of the voice understanding device 41 adjusts the pre-scores corresponding to the intention information A, B and C to 0.1, 0.8 and 0.1, respectively.

That is, in the context K4, since the user already knows tomorrow's weather information or the current time information, the probability that the user again makes the utterance corresponding to the intention information A "ASHITA-NO-TENKI-WO-OSHIETE-KUDASAI (Let me know the weather tomorrow)" or the intention information C "IMA-NO-JIKAN-WO-OSHIETE-KUDASAI (Can you tell me the time, please?)" becomes low. Thus, in the context K4, the pre-scores corresponding to the intention information A and the intention information C are adjusted to be decreased to 0.1. Further, in the context K4, the pre-score corresponding to the intention information B is adjusted to 0.8 (=1.0−0.1−0.1).

As described above, in the second embodiment, the pre-score corresponding to each of intention information is adjusted according to the context. As a result, a process accuracy in step S6 and step S7 in the voice understanding process in FIG. 3, that is, a process accuracy in selection of the intention information by means of the intention determination section 67 and calculation of the reliability by means of the intention reliability calculation section 68 is enhanced.

3. Third Embodiment

In the above described first embodiment and the second embodiment, a signal of a silent zone included in the input voice signal is not taken into account. However, the validity of the reliability of the intention model 66 which is calculated by the intention reliability calculation section 68 in FIG. 2 is influenced by the signal of the silent zone included in the input voice signal. Thus, in the third embodiment, the signal of the silent zone included in the input voice signal is removed, and then, the reliability of an intention model 66-$k$ with respect to a signal of a voice zone is calculated.

In this respect, a configuration of a voice understanding device 41 according to the third embodiment is the same as in the first embodiment as shown in FIG. 2.

[Removal of the Silent Zone Included in the Input Voice Signal]

FIG. 15 is a diagram illustrating a silent zone included in the input voice signal.

Figure 15A:
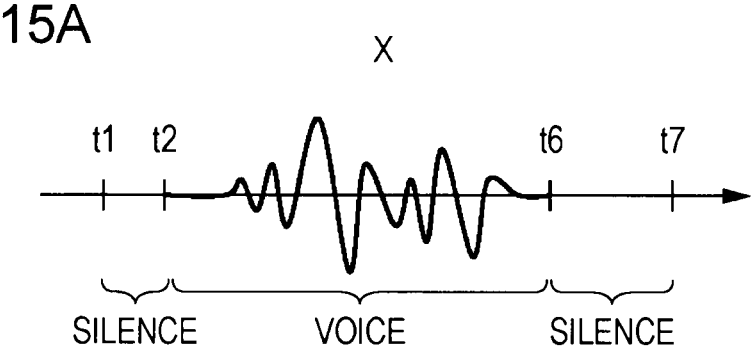
FIG. 15 is a diagram illustrating a silent zone included in an input voice signal.

For example, as shown in FIG. 15A, an input voice signal X is given in a section ranging from a time t1 to a time t7. The input voice signal X includes a signal of the silent zone after utterance. Specifically, for example, in FIG. 15A, in the section ranging from the time t1 to the time t2 and a section ranging from a time t6 to a time t7, the silent zone signals are included, respectively.

Figure 15B:
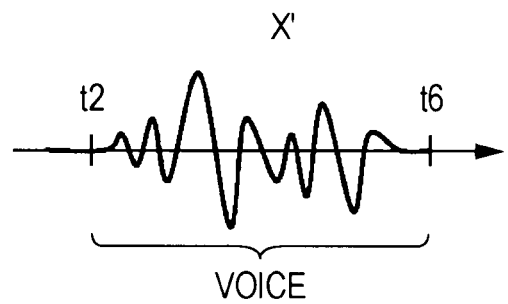

In such a case, in the third embodiment, as shown in FIG. 15B, the intention reliability calculation section 68 calculates the reliability using as a process target the input voice signal X' in a section ranging from the time t2 to the time t6 in which the signals of the silent zones are removed. As a result, compared with the first embodiment, the validity of the reliability is enhanced. This is because acoustic information and linguistic information for estimating intention of the utterance are not included in the signals in the silent zones.

The process for removing the signal of the silent zone from the input voice signal, for example, is performed by the feature extraction section 63 or the multi-matching section 64.

For example, as the process for removing the signal of the silent zone, on the basis of power of the input voice signal, the feature extraction section 63 recognizes a zone of the power which is larger than or equal to a threshold value as the voice zone, and recognizes the other zones as the silent zone, to thereby remove the recognized silent zone signal.

On the other hand, the multi-matching section 64 performs, for example, the following process as the process for removing the signal of the silent zone.

FIG. 16 is a diagram illustrating an example of the process for removing the signal of the silent zone by means of the multi-matching section 64, which is a diagram illustrating a starting time and an ending time with respect to each word.

In FIG. 16, items of "word", "starting time" and "ending time" are shown.

In this respect, the times t1 to t7 shown in the "starting time" and the "ending time" are the same as the times t1 to t7 as shown in FIG. 15A. That is, in a case where the input voice signal X in FIG. 15A is input in the example of FIG. 16, it is presumed that the multi-matching process is performed with respect to one predetermined intention model 66-$k$ by means of the multi-matching section 64. Under such a presumption, each word which forms a word sequence obtained as a result of the multi-matching process with respect to the intention model 66-$k$, and the starting time and the ending time of each word are shown in FIG. 16.

Specifically, for example, a word sequence "silence ASHITA NO TENKI OSHIETE silence" is determined by the multi-matching section 64, and each word forming the word sequence is described in each row of the "word" item. In this respect, the word "silence" represents a word corresponding to a probability model which is used for matching with respect to the feature amount sequence of the silent zone.

In the "starting time" item, the starting time of the word described in the "word" item in the same row is described. In the "ending time" item, the ending time of the word described in the "word" item in the same row is described. Further, a determining technique of the starting time and the ending time of each word is not particularly limited, but for example, in the present embodiment, a technique in which the starting time and the ending time are determined using a Viterbi search during the multi-matching process is employed.

Specifically, for example, in the first row, the word "silence" is described in the "word" item; the time t1 is described in the "starting time" item; and the time t2 is described in the "ending time" item. Thus, it could be understood that the word "silence" which appears at the beginning of the word sequence is a word compatible with a signal from the time t1 to the time t2, among the input voice signal X in FIG. 15A which is the input voice signal.

Similarly, for example, in the second row, the word "ASHITA (tomorrow)" is described in the "word" item; the time t2 is described in the "starting time" item; and the time t3 is described in the "ending time" item. Thus, it could be understood that the word "ASHITA" which appears in the second row of the word sequence is a word compatible with a signal from the time t2 to the time t3, among the input voice signal in FIG. 15A which is the input voice signal.

Further, for example, in the sixth row, the word "silence" is described in the "word" item; the time t6 is described in the "starting time" item; and the time t7 is described in the "ending time" item. Thus, it could be understood that the word "silence" which appears at the end of the word sequence is a word compatible with a signal from the time t6 to the time t7, among the input voice signal X in FIG. 15A which is the input voice signal.

Similarly, in the other rows, for example, among the word sequence "silence ASHITA NO TENKI OSHIETE silence" which is determined by the multi-matching section 64, predetermined words are described in the "word" item. Further, starting times of predetermined words are described in the "starting time" item, and ending times of predetermined words are described in the "ending time" item.

In this case, among the input voice signal X in FIG. 15A which is the input voice signal, the multi-matching section 64 removes the signal from the starting time t1 of the word "silence" which appears at the beginning of the word sequence to the ending time t2 thereof, as the signal of the silent zone. Similarly, among the input voice signal X in FIG. 15A which is the input voice signal, the multi-matching section 64 removes the signal from the starting time t6 of the word "silence" which appears at the end of the word sequence to the ending time t7 thereof, as the signal of the silent zone.

4. Fourth Embodiment

In the above described first to third embodiments, even in a case where the input voice signal does not represent a specific meaning, it is likely that a high reliability is given to selected intention information. However, in the case where the input voice signal does not represent the specific meaning, even though the high reliability is given to the selected intention information, it is not preferable that the intention information is employed as a voice understanding result as it is. Thus, in the fourth embodiment, in order to increase the validity of the voice understanding result, in the case where the input voice signal does not represent the specific meaning, an utterance corresponding to the input voice signal is determined as a meaningless utterance, and the determination result is added to the voice understanding result.

In this respect, a configuration of a voice understanding device 41 according to the fourth embodiment is the same as in the first embodiment as shown in FIG. 2.

In the fourth embodiment, as one specific intention model 66-$r$ ($r$ is an arbitrary integer value of 1 to N) among intention models 66-1 to 66-N, a model corresponding to universal intention information which does not indicate a specific intention is formed. That is, the universal intention information (in other words, intention model other than intention models 66-$k$ ($k$=1, 2, ..., N, $k \neq r$)) which does not indicate the specific intention is stored in an intention information storage section 91-$r$ of the intention model 66-$r$.

In this case, a dictionary recorded in a dictionary database 92-$r$ of the intention model 66-$r$ and a grammar rule recorded in a grammar database 93-$r$ thereof are not generated on the basis of the example sentences corresponding to the intention information of the specific utterance as shown in FIG. 5 or FIG. 10. The dictionary recorded in the dictionary database 92-$r$ and the grammar rule recorded in the grammar database 93-$r$ are generated on the basis of example sentences corresponding to intention information of utterances which are randomly and massively collected. That is, a dictionary which includes a large vocabulary is recorded in the dictionary database 92-$r$ and a universal trigram grammar is recorded in the grammar database 93-$r$, so that a random utterance of the user becomes a process target of the voice understanding process.

For example, the input voice signal does not relate to any intention information corresponding to each of the intention models 66-1 to 66-N in which the intention model 66-$r$ is removed.

In this case, an acoustic score and a language score which are calculated with respect to each of the intention models 66-1 to 66-N in which the intention model 66-r is removed become a low value, respectively. In this respect, an acoustic score and a language score which are calculated with respect to the intention model 66-r become a high value, respectively.

Accordingly, the intention determination section 67 selects the intention information corresponding to the intention model 66-r, as intention information corresponding to the utterance of the user.

In the case where the intention determination section 67 selects the intention information corresponding to the intention model 66-r in this way, the utterance of the user is determined as a meaningless utterance, and the determination result that the utterance of the user is the meaningless utterance is added to the selected intention information for output. Further, the series of processes by means of the intention determination section 67 according to the above described fourth embodiment are referred to as a meaningless utterance determination process. Details of the meaningless utterance determination process will be described with reference to a flowchart in FIG. 17.

On the other hand, in this case, the reliability with respect to the intention model 66-r is calculated according to the Formula 3 in the same way as in the other cases. It is because the fact that the dictionary of the intention model 66-r includes a large vocabulary and the grammar rule of the intention model 66-r is the universal trigram grammar does not affect the calculation of the reliability on the basis of the Formula 3. That is, the intention reliability calculation section 68 uses an acoustic score, a language score and a pre-score which are provided from the multi-matching section 64 with respect to the intention model 66-r in a similar way to the other cases, to thereby calculate the reliability.

Finally, in addition to the intention information selected by the intention determination section 67, and the reliability of the intention model 66 corresponding to the intention information, the determination result of the meaningless utterance by means of the intention determination section 67 are output from an output section 69 as a voice understanding result.

In a case where intention information corresponding to any one of the intention models 66-1 to 66-N in which the intention model 66-r is removed is selected, in a similar way to the other cases, the intention information which is selected by the intention determination section 67 and the reliability of the intention model 66 corresponding to the intention information are output from the output section 69 as the voice understanding result.

[Meaningless Utterance Determination Process]

Figure 17:
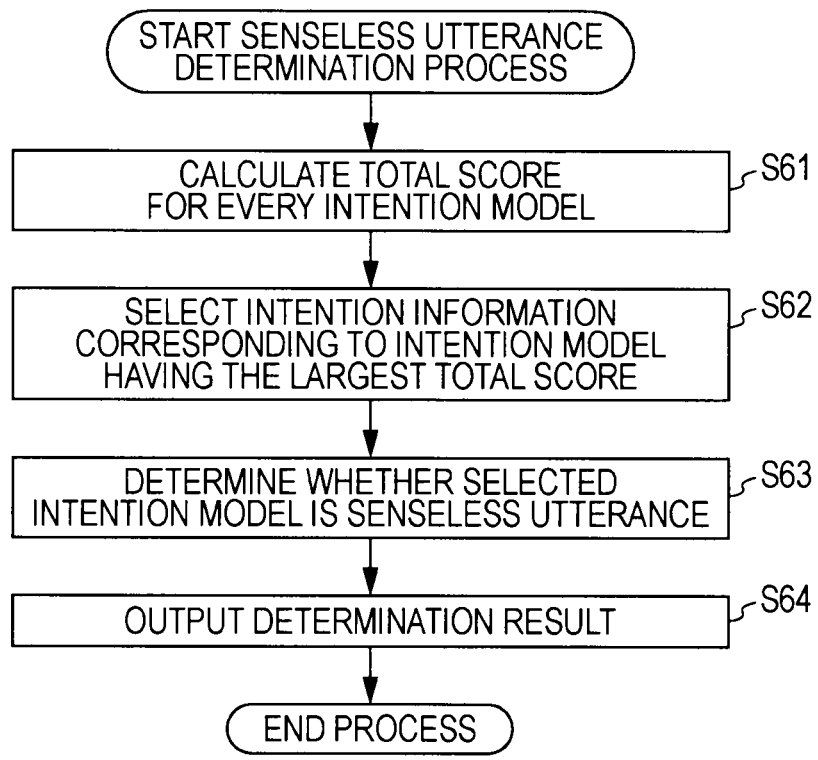
FIG. 17 is a flowchart illustrating an example of a meaningless utterance determination process.

FIG. 17 is a flowchart illustrating an example of the meaningless utterance determination process by means of the intention determination section 67 according to the fourth embodiment.

The meaningless utterance determination process is performed instead of the processes of steps S5 and S6, after the multi-matching process of step S4 in FIG. 3. That is, in the voice understanding process according to the fourth embodiment, after the processes of steps S1 to S4 in FIG. 3 are performed in the same way as in the other embodiments, the following processes of steps S61 to S64 are performed.

In step S61, the intention determination section 67 totalizes the acoustic score, the language score and the pre-score which are provided from the multi-matching section 64 for each of the plurality of intention models 66-1 to 66-N, to thereby calculate the total score thereof.

In step S62, the intention determination section 67 selects intention information corresponding to the intention model 66-t (t is any integer value of 1 to N) having the largest total score Tt among the intention models 66-1 to 66-N. Further, at this time, the intention determination section 67 may select the plural pieces of intention information corresponding to the plurality of upper intention models 66 which is larger than a threshold value in which the total score is preset, among the intention models 66-1 to 66-N.

In step S63, the intention determination section 67 determines whether the selected intention information corresponds to the meaningless utterance. That is, in the case where the intention determination section 67 selects the intention information corresponding to any one of the intention models 66-1 to 66-N in which the intention model 66-r is removed, it is determined that the utterance of the user is not the meaningless utterance. In this respect, in a case where the intention determination section 67 selects the intention information corresponding to the intention model 66-r, it is determined that the utterance of the user is the meaningless utterance.

In step S64, the intention determination section 67 adds the determination result on whether the utterance of the user is the meaningless utterance to the selected intention information for output.

Thus, the meaningless utterance determination process by means of the intention determination section 67 is completed. Then, the processes of step S7 and after in FIG. 3 are performed.

That is, in the process of step S7, the reliability of the intention information which is selected by the intention determination section 67 is calculated, and the voice understanding result is output in the process of step S8.

Specifically, for example, in a case where the intention information corresponding to the intention model 66-k other than the intention model 66-r is selected, in similar way to the other cases, the selected intention information and the reliability of the intention model 66-k corresponding to the intention information are output from the output section 69 as the voice understanding result.

In this respect, for example, in the case where the intention information corresponding to the intention model 66-r is selected, in addition to the selected intention information and the reliability of the intention model 66-k corresponding to the intention information, the determination result of the meaningless utterance are output from the output section 69 as the voice understanding result.

In a case where the determination result of the silent utterance is included in the voice understanding result in the subsequent processes, the voice understanding device 41 or any other device (not shown) can reject the voice understanding result irrespective of the reliability. On the other hand, in a case where the determination result of the meaningless utterance is not included in the voice understanding result, the voice understanding device 41 or the other device (not shown) can determined whether the voice understanding result is to be accepted or rejected on the basis of the reliability. The application examples of the voice understanding result will be described with reference to FIGS. 19 and 20.

[Experimental Results]

Figure 18:
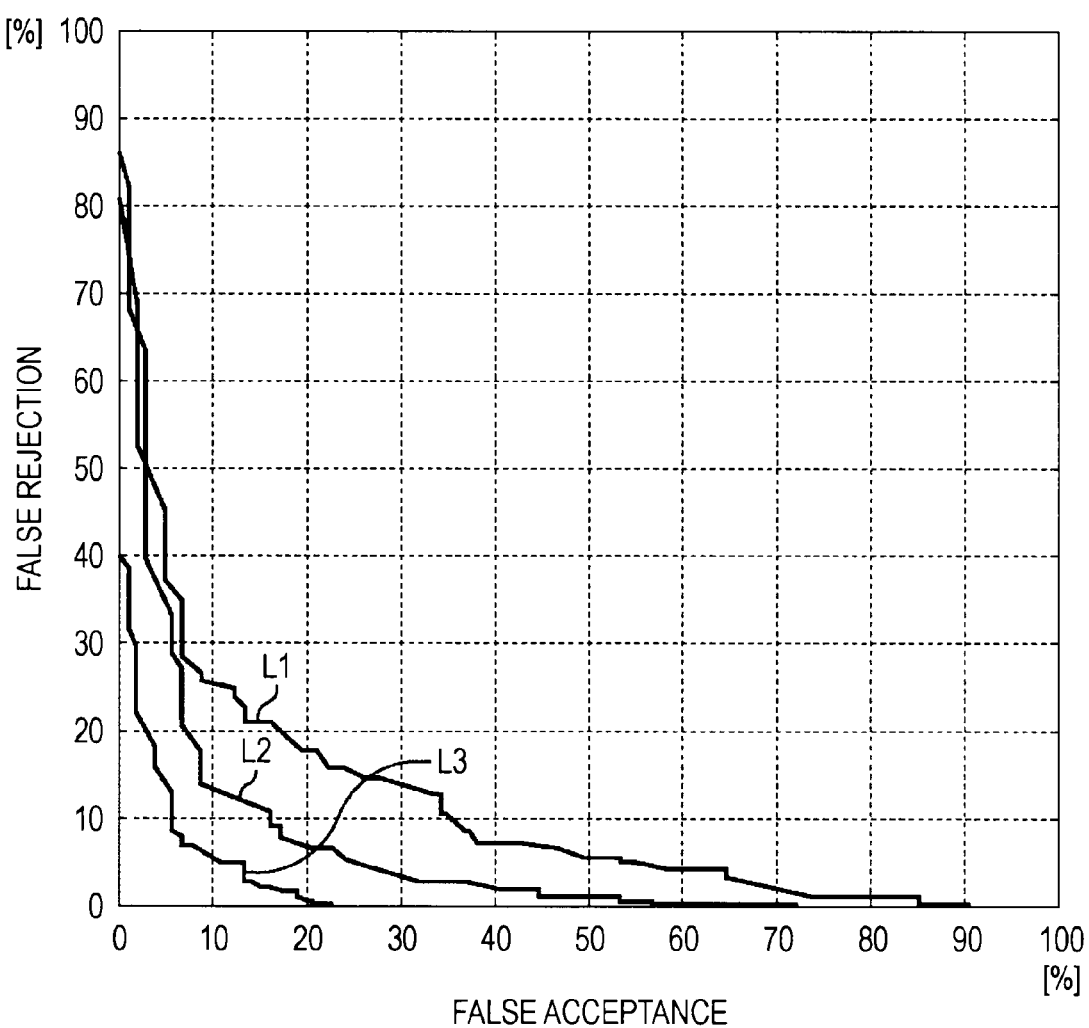
FIG. 18 is a diagram illustrating an experimental result.

FIG. 18 is a diagram illustrating experimental results according to the first, third and fourth embodiments.

The present inventors have performed experiments that voice understanding results are output to each of the voice understanding devices 41 according to the first, third and fourth embodiments, using input voice signals which are made from 86 utterances uttered by each of five persons being men and women.

In this case, the number of the input voice signals (hereinafter, referred to as "evaluation data") of the process target becomes 430, the voice understanding result is output for each voice section. Further, 14 types of intention models 66-1 to 66-14 are provided in the voice understanding device 41 according to each embodiment. The number of words in the dictionaries included in the respective intention models 66-1 to 66-14 is different, which are all together about 35,000 words. As the grammar rule included in each of the intention models 66-1 to 66-14, the trigram grammar is employed. An MFCC (Mel Frequency Cepstrum Coefficients) is employed for an acoustic analysis, and the HMM (Hidden Markov Model) is used as an acoustic model. The evaluation data includes meaningful utterances corresponding to any one among the prepared intention models 66-1 to 66-14, and meaningless utterances which do not correspond to any one among the prepared intention models 66-1 to 66-14. Specifically, 65 utterances among the 86 utterances are the meaningful utterances, and the remaining 21 utterances are the meaningless utterances.

The voice understanding device 41 according to each embodiment determines as a correct answer in a case where the intention information corresponding to the meaningful utterances included in the evaluation data can be correctly selected, and determines as an incorrect answer in a case where the intention information corresponding to the meaningful utterances included in the evaluation data is not correctly selected. Further, the voice understanding device 41 according to each embodiment accepts the selected intention information in a case where the given reliability with respect to the input voice signal is larger than a predetermined threshold value. On the other hand, the voice understanding device 41 according to each embodiment rejects the selected intention information in a case where the reliability thereof is smaller than the predetermined threshold value.

In this respect, with respect to the meaningful utterances, even though the intention determination section 67 can correctly select the intention information, the mistakenly rejected intention information which is generated since the given reliability is smaller than the predetermined threshold value is referred to as a "false rejection error", hereinafter. Further, the mistakenly accepted intention information which is generated since the given reliability with respect to the meaningless utterances is larger than the predetermined threshold value is referred to as a "false acceptance error", hereinafter.

In FIG. 18, the longitudinal axis represents a ratio (%) of the false rejection error, and the transverse axis represents a ratio (%) of the false acceptance error. Curves L1 to L3 represent the ratios of the false rejection error and the false acceptance error in a case where the threshold value of the reliability determination is changed.

For example, in a case where the threshold value is set exceedingly small and the estimation results of all the intention information are accepted, the false rejection error becomes 0, and the false acceptance error becomes 100. In this respect, the threshold value is set exceedingly large and the estimation results of all the intention information are rejected, the false rejection error becomes 100, and the false acceptance error becomes 0. As described above, it could be understood that the false rejection error and the false acceptance error are in a trade-off relationship. Thus, hereinafter, the curves L1 to L3 as shown in FIG. 18 are referred to as determination error trade-off curves L1 to L3.

The determination error trade-off curve L1 represents the performance result of the voice understanding device 41 according to the first embodiment (a case where a simple reliability determination is performed without performing the removal of the silence zone and the determination of the meaningless utterance). In the first embodiment, as the threshold value is appropriately set, the ratios of the false rejection error and the false acceptance error become about 20, respectively.

The determination error trade-off curve L2 represents the performance result of the voice understanding device 41 according to the third embodiment in which the silence zone of the input voice signal is removed and the reliability is calculated. As a predetermined threshold value is appropriately set, the ratios of the false rejection error and the false acceptance error can be restricted up to about 12, respectively. As the silence zone of the input voice signal is removed by the determination error trade-off curve L2 and the reliability is calculated, the validity of the reliability of the embodiment of the invention can be enhanced compared with the first embodiment.

The determination error trade-off curve L3 represents the performance result of the voice understanding device 41 according to the fourth embodiment in which the determination result of the meaningless utterances is added to the voice understanding result. As a predetermined threshold value is appropriately set, the ratios of the false rejection error and the false acceptance error can be restricted up to about 7, respectively. As the determination result of the meaningless utterances is added to the voice understanding result by the determination error trade-off curve L3, the validity of the voice understanding result of the embodiment of the invention can be enhanced compared with the third embodiment.

By combining two or more of the above described first to fourth embodiments, a synergetic effect can be realized.

5. Fifth Embodiment

Configuration Example of Information Presentation Device

Figure 19:
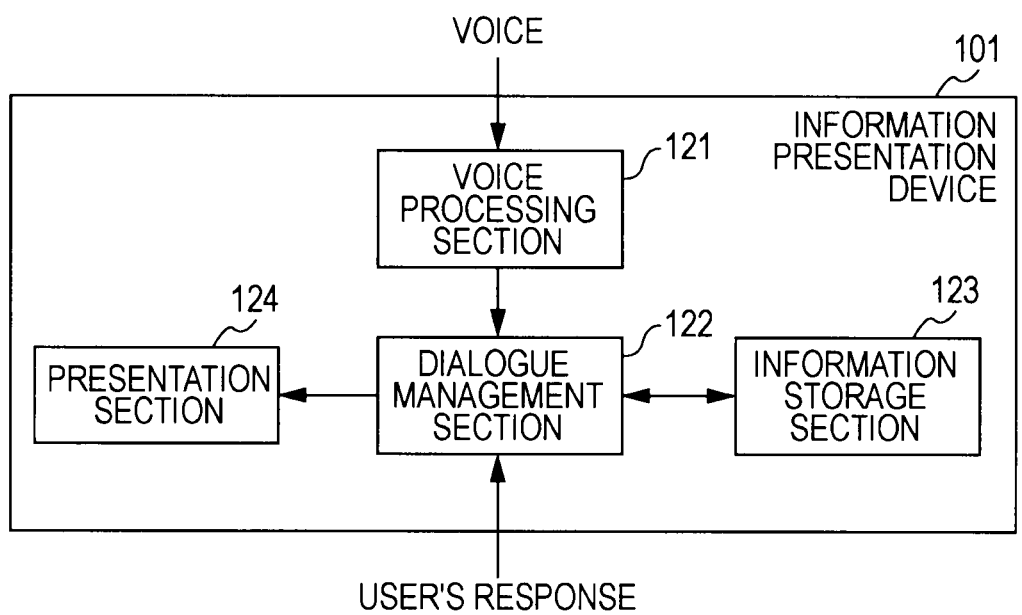
FIG. 19 is a block diagram illustrating a configuration of an information presentation device according to an embodiment of the present invention.

FIG. 19 is a block diagram illustrating a configuration of an embodiment of an information presentation device which is a voice processing device according to the embodiment of the invention.

An information presentation device 101 in FIG. 19 includes a voice understanding section 121, a dialogue management section 122, an information storage section 123 and a presentation section 124.

The voice understanding section 121 has the same function and configuration as in the voice understanding device 41 as shown in FIG. 2 (the first to fourth embodiments as described above). In this respect, repetitive description will be omitted.

A voice which is uttered by a user undergoes, as an input voice signal, the above described voice understanding process (FIG. 3) by means of the voice understanding section 121. As a result, a voice understanding result is output from the voice understanding section 121.

The dialogue management section 122 performs the following process according to the reliability given to intention information which is included in the voice understanding result by means of the voice understanding section 121. That is, the dialogue management section 122 obtains, in a case where the reliability included in the voice understanding result is exceedingly high, information corresponding to the intention information included in the voice understanding result from the information storage section 123. On the other hand, in a case where the reliability included in the voice understanding result is exceedingly low, the dialogue management section 122 rejects the voice understanding result.

Specifically, the information corresponding to the intention information is not obtained. Further, in a case where the reliability included in the voice understanding result is within a specific range, the dialogue management section 122 requests the user to perform a confirmation of the voice understanding result.

In the information storage section 123 is stored a variety of information corresponding to each intention information which corresponds to each of the plurality of intention models 66-1 to 66-N which are stored in the voice understanding section 121. Specifically, for example, weather information corresponding to the intention information with respect to the weather, time information corresponding to the intention information with respect to time, or the like is stored in the information storage section 123.

The presentation section 124 presents the information itself which is obtained by the dialogue management section 122 or a variety of information based on the obtained information to the user through a display, or a speaker, or the like. Further, an operation corresponding to a command is performed by means of a motor or any other actuator. In addition, in a case where the confirmation of the voice understanding result with respect to the user is performed by the dialogue management section 122, the presentation section 124 presents the confirmation content to the user. Further, the presentation section 124 can present to the user what kind of voice can be input.

In this respect, the information stored in the information storage section 123 may be information corresponding to predetermined intention information. Further, the output the presentation section 124 may have a variety of formats including an image output by means of the display or an audio output by means of the speaker.

For example, in a case where the information presentation device 101 is applied as at least a part element of a robot, a variety of operations of the robot may be employed as the output format of the presentation section 124. Further, in a case where intention information "TATTE-KUDASAI (Please stand up)" corresponds to utterances such as "TATTE (Up)", "OKITE (Up)" and "TACHIAGATTE (Stand up)", it is possible to enable a command for instructing a standup operation to correspond to the intention information. In this way, a variety of commands for instructing operations corresponding to a variety of intention information can correspond to the variety of intention information.

In such a case, the variety of commands is stored in the information storage section 123. Then, the dialogue management section 122 obtains, in a case where the voice understanding result including the exceedingly high reliability is provided, a command corresponding to the intention information included in the voice understanding result, from the information storage section 123. The presentation section 124 analyzes the command obtained by the dialogue management section 122, and performs a driving control for the robot so that the robot performs an operation instructed by the command.

In this respect, in the case where the reliability included in the voice understanding result is exceedingly low, the dialogue management section 122 rejects the voice understanding result. However, the robot does not perform an operation corresponding to the intention information in which the reliability is exceedingly low (no response). That is, the robot does not perform an operation which may be recognized as a malfunction, which is not intended by the user.

In addition, in the case where the reliability included in the voice understanding result is within the specific range, the dialogue management section 122 requests the user to perform the confirmation of the voice understanding result through the presentation section 124. That is, for example, the dialogue management section 122 makes an utterance for confirming whether the robot is properly operated with respect to the intention information included in the voice understanding result, with respect to the user.

As described above, since the reliability is given to the voice understanding result with respect to the intention (intention information) of the utterance which is estimated from the input voice, the reliability of the control performed using the utterance intention which is estimated from the input voice signal, that is, the reliability of the operation control of the robot can be more effectively enhanced.

Hereinafter, the series of processes performed by means of such an information presentation device 101 is referred to as an information presentation process.

[Information Presentation Process]

Figure 20:
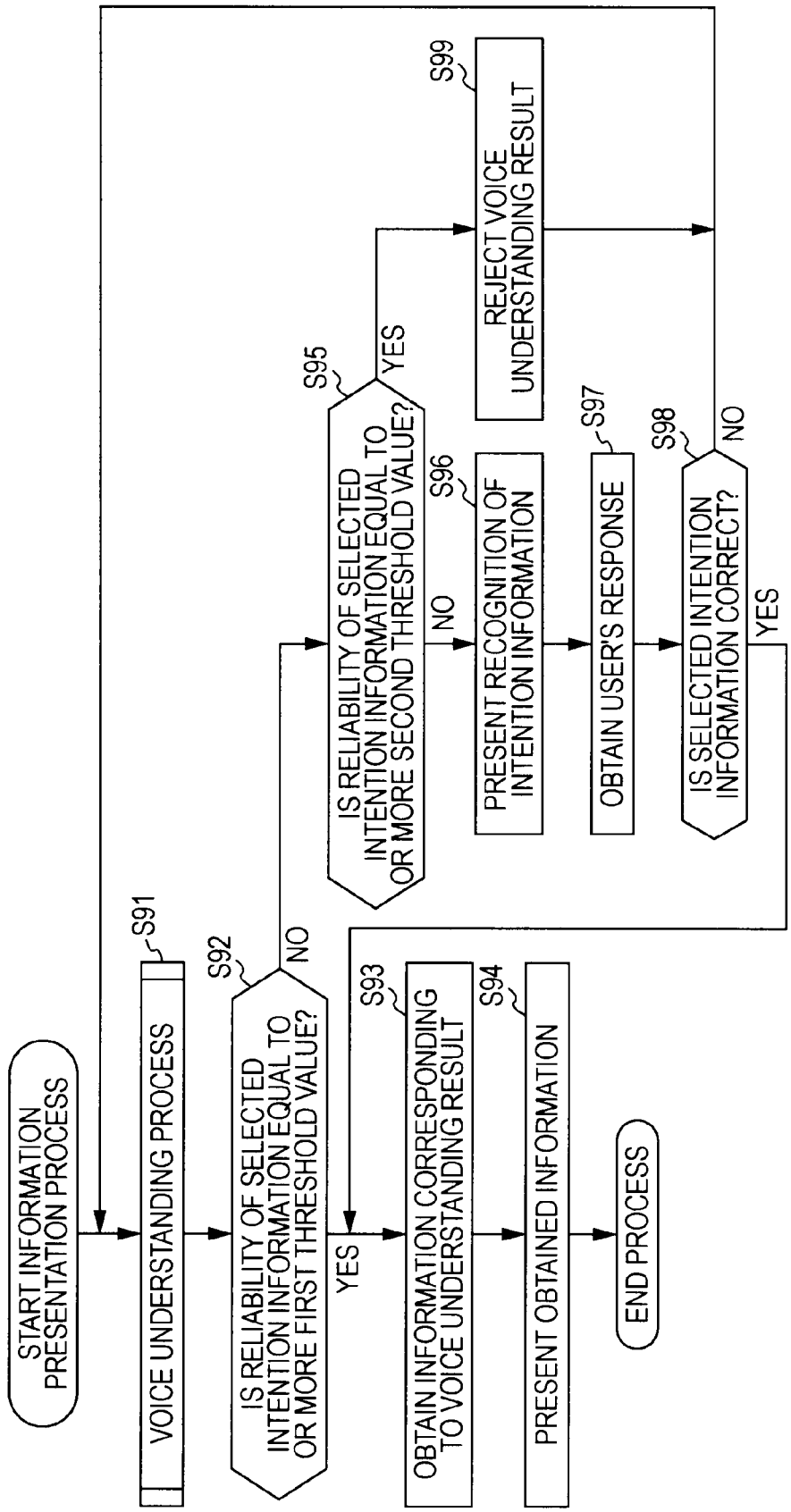
FIG. 20 is a flowchart illustrating an example of an information presentation process.

FIG. 20 is a flowchart illustrating an example of the information presentation process by means of the information presentation device 101.

In this respect, as a specific example, the following three intention models 66-A to 66-C are provided in the voice understanding section 121. The intention model 66-A is an intention model which corresponds to intention information A "ASHITA-NO-TENKI-WO-OSHIETE-KUDASAI (Let me know the weather tomorrow)"; The intention model 66-B is an intention model which corresponds to intention information B "RISETTO-SHITE-KUDASAI (Please reset)"; and the intention model 66-C is an intention model which corresponds to intention information C "IMA-NO-JIKAN-WO-OSHIETE-KUDASAI (Can you tell me the time, please?)". The information presentation device 101 performs the information presentation process on the basis of the voice understanding result based on these three pieces of intention information.

In step S91, the voice understanding section 121 performs the above described voice understanding process with respect to an input voice signal, and outputs the voice understanding result.

For example, if a user makes an utterance "E-TO-ASHITA-NO-TENKI-OSHIETE (Well, let me know the weather tomorrow)", the voice which is uttered by the user undergoes, as an input voice signal, the voice understanding process through the voice understanding section 121. Further, as the voice understanding result, the intention information A of the intention model 66-A "ASHITA-NO-TENKI-WO-OSHIETE-KUDASAI (Let me know the weather tomorrow)" and the reliability of the intention model 66-A are output from the voice understanding section 121.

In step S92, the dialogue management section 122 which is management means determines whether the reliability of the intention information which is included in the voice understanding result output from the voice understanding section 121 is larger than or equal to a first threshold value. The first threshold value is a threshold value which can be appropriately adjusted.

In a case where it is determined in step S92 that the reliability of the intention information is larger than or equal to the first threshold value, the dialogue management section 122 obtains, from the information storage section 123, information corresponding to the intention information included in the voice understanding result, in step S93.

For example, the dialogue management section 122 obtains information corresponding to the intention information A "ASHITA-NO-TENKI-WO-OSHIETE-KUDASAI (Let me know the weather tomorrow)" of the intention model 66-A, which is included in the voice understanding result, that is, weather information from the information storage section 123.

In step S94, the presentation section 124 presents the information obtained by the dialogue management section 122 to the user.

That is, in this case, the presentation section 124 presents the weather information to the user. Thus, the information presentation process is terminated.

As described above, in the case where the reliability of the intention information included in the voice understanding result is larger than or equal to the first threshold value, the information corresponding to the intention information is presented to the user.

On the other hand, in a case where the reliability of the intention information included in the voice understanding result is smaller than the first threshold value, the dialogue management section 122 determines whether the reliability of the intention information included in the voice understanding result by means of the voice understanding section 121 is smaller than or equal to a second threshold value, in step S95. In this respect, the second threshold value is a threshold value which can be appropriately adjusted, but is smaller than the first threshold value.

In a case where the reliability of the intention information included in the voice understanding result is smaller than or equal to the second threshold, the dialogue management section 122 rejects the voice understanding result, in step S99. Thereafter, the procedure returns to step S91, to repeat the same processes. That is, the case where the voice understanding result is rejected means a case where it is determined that the intention information included in the voice understanding result is exceedingly low in its reliability so that the intention information does not represent the user's intention. Thus, in this case, the information corresponding to the intention information is not presented, and the voice understanding process is performed again. Accordingly, it is possible to more reliably estimate a correct intention only.

In the process of step S99, the dialogue management section 122 may present the fact that the voice understanding result has been rejected to the user through the presentation section 124. Further, in order for the voice understanding section 121 to perform the voice understanding process again, the dialogue management section 122 may present information for requesting the user to input a voice once again through the presentation section 124, in step S99.

For example, in a case where a user makes an utterance "ETO-ASHITA-NO-NYUSU-OSHIETE-KURERU (Well, can you tell me tomorrow news?)", it is assumed that the intention information A "ASHITA-NO-TENKI-WO-OSHIETE-KUDASAI (Let me know the weather tomorrow)" of the intention model 66-A is incorrectly selected as the voice understanding result. However, if the reliability of the intention model 66-A is given exceedingly low, the voice understanding result thereof is rejected on the basis of the reliability. That is, the information presentation device 101 does not present the information corresponding to the intention information in which the reliability is exceedingly low, that is, in this case, the weather information.

As described above, in the case where the reliability of the intention information included in the voice understanding result is smaller than or equal to the second threshold value, the voice understanding result is rejected.

On the other hand, in a case where the reliability of the intention information included in the voice understanding result is larger than the second threshold value, that is, in a case where the reliability is a value between the first threshold value and the second threshold value, the dialogue management section 122 presents information for requesting the user to confirm the intention information through the presentation section 124, in step S96.

For example, in a case where the user makes an utterance "ETO-ASHITA-NO-NYUSU-OSHIETE-KURERU (Well, can you tell me tomorrow news?)", it is assumed that the intention information A "ASHITA-NO-TENKI-WO-OSHIETE-KUDASAI (Let me know the weather tomorrow)" of the intention model 66-A is selected as the voice understanding result. However, in a case where the reliability of the intention model 66-A is larger than the second threshold value and smaller than the first threshold value, the dialogue management section 122 presents the following information to the user through the presentation section 124, on the basis of the reliability. That is, the dialogue management section 122 presents information for requesting a confirmation of the intention information A "ASHITA-NO-TENKI-NI-TUITE-OKIKI-NI-NARIMASHITAKA (Have you heard about the weather tomorrow?" through the presentation section 124.

The user who is requested to confirm the intention information in this way inputs a response about whether or not the intention information is correct to the dialogue management section 122. Here, the dialogue management section 122 obtains the user's response in step S97.

In step S98, the dialogue management section 122 determines whether or not the intention information included in the voice understanding result is correct on the basis of the user's response.

In a case where it is determined in step S98 that the intention information included in the voice understanding result is not correct, the procedure returns to step S91 to repeat the same processes. In this respect, in order for the voice understanding section 121 to perform the voice understanding process again, the dialogue management section 122 may present information for requesting the user to input a voice once again through the presentation section 124, in step S98.

On the other hand, in a case where the intention information is correct is step S98, the procedure returns to step S93 to repeat the same processes. That is, the dialogue 122 obtains the information corresponding to the voice understanding result, and presents the information to the user through the presentation section 124.

As described above, in the case where the reliability of the intention information included in the voice understanding result is larger than the second threshold value and smaller than the first threshold value, the user is requested to confirm the intention information. Thus, it is possible to avoid presenting intention which is not intended by the user and to present only the correct intention to the user.

The embodiments of present invention can be applied to a database retrieving device which is configured to display corresponding map information or the like with respect to inquiries of geographical names or the like by means of voices, an industrial robot which is configured to perform sorting of luggage or the like according to voice command words, application software on computers which is configured to operate according to voice instructions, a robot dialogue system which is configured to make conversation with a user, and so forth.

[Application of the Invention to a Program]

The above described series of processes may be performed by hardware or by software.

Figure 21:
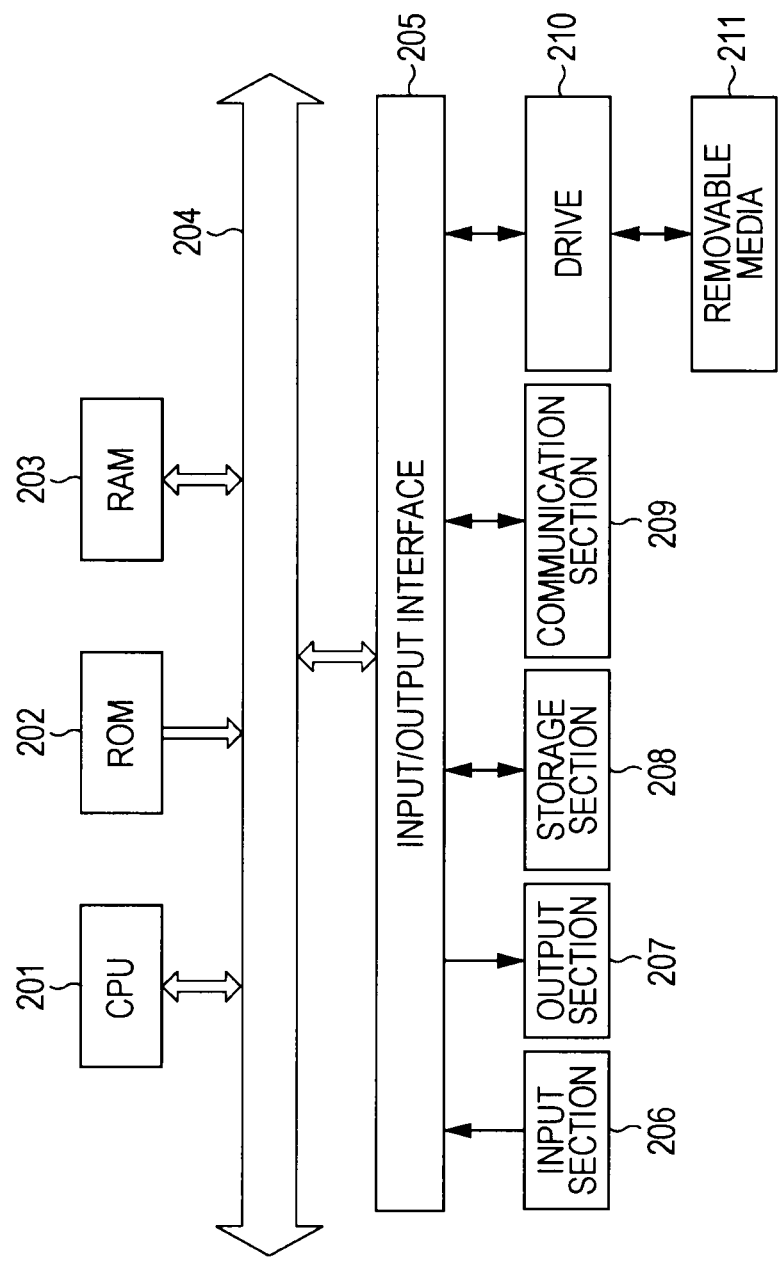
FIG. 21 is a block diagram illustrating a configuration example of hardware of a voice processing device according to an embodiment of the present invention.

In this case, as at least a part of the above described information processing device, for example, a personal computer as shown in FIG. 21 may be employed.

In FIG. 21, a CPU (Central Processing Unit) 201 performs a variety of processes according to programs recorded in a ROM (Read Only Memory) 202, or performs a variety of programs according to a program loaded to a RAM (Random Access Memory) 203 from a storage section 208. Data or the like which is used for performing the various processes by the CPU 201 is also appropriately stored in the RAM 203.

The CPU 201, the ROM 202 and the RAM 203 are connected to each other through a bus 204. The bus 204 is also connected with an input and output interface 205.

An input section 206 including a keyboard or mouse, and an output section 207 including a display are connected to the input and output interface 205. Further, the storage section 208 including a hard disc, and a communication section 209 including a modem or terminal adaptor are connected thereto. The communication section 209 controls communication with respect to other devices (not shown) through a network including the Internet.

A drive 210 is also connected to the input and output interface 205 as necessary, and a removable media 211 including a magnetic disc, an optical disc, a magneto-optical disc, or a semiconductor memory is appropriately installed thereto. Further, the computer program read therefrom is installed in the storage section 208 as necessary.

In a case where the series of processes is performed by software, the program which forms the software is installed in a computer which is set in specially used hardware, a universal personal computer capable of performing a variety of functions by installment of a variety of programs, or the like, from a network or a recording medium.

As shown in FIG. 21, the recording medium including such programs is provided with the removable media 211 (package media) such as a magnetic disc (including a floppy disk), an optical disc (CD-ROM (Compact Disc-Read Only Memory), DVD (Digital Versatile Disc)), a magneto-optical disc (including MD (Mini Disc)), or a semiconductor memory, which is separately provided from a device main body and is distributed to supply the programs to a user, or is provided with the ROM 202 in which the programs are recorded, a hard disc included in the storage section 208, or the like in a state of being provided in advance in the device main body.

In this description, steps for describing the programs to be recorded in the recording medium include processes which are performed in a time-sequence order, and processes which are performed in a parallel or individual manner.

The present application contains subject matter related to that disclosed in Japanese Priority Patent Application JP 2009-177578 filed in the Japan Patent Office on Jul. 30, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A voice processing device comprising:
score calculation means for calculating a score indicating compatibility of a voice signal input on the basis of an utterance of a user with each of plural pieces of intention information indicating each of a plurality of intentions;
pre-score calculation means for calculating a pre-score, for each of the plural pieces of intention information, that specifies an occurrence probability for each of the plural pieces of intention information, the pre-score being calculated based on transitioning through a state transition model based on words of the utterance of the user, a plurality of states in the state transition model corresponding to a predetermined conversation, the words of the utterance of the user being a condition that results in the transitioning, the score being based on the pre-score;
intention selection means for selecting the intention information indicating the intention of the utterance of the user among the plural pieces of intention information on the basis of the score calculated by the score calculation means; and
intention reliability calculation means for calculating the reliability of the intention information selected by the intention selection means on the basis of the score calculated by the score calculation means.

2. The voice processing device according to claim 1, wherein the score calculation means includes:
acoustic score calculation means for calculating an acoustic score as the score indicating an acoustic compatibility of the voice signal with intention information, for each of the plural pieces of intention information; and
language score calculation means for calculating a language score as the score indicating a language compatibility of the voice signal with intention information, for each of the plural pieces of intention information.

3. The voice processing device according to claim 1, wherein the pre-score calculation means adjusts the pre-score for each of the plural pieces of intention information in response to a context at the time when the voice signal is input.

4. The voice processing device according to claim 3, wherein the score calculation means calculates the score of a voice zone in the voice signal.

5. The voice processing device according to claim 3, wherein the score calculation means further calculates the score of the intention information which does not indicate a specific intention among the plural pieces of intention information, and
wherein the intention selection means determines, in a case where the intention information which does not indicate the specific intention is selected, that the utterance of the user corresponding to the voice signal is a meaningless utterance which does not indicate a specific intention.

6. The voice processing device according to claim 3, wherein the score calculation means gives a weight to each of the acoustic score, the language score and the pre-score, and
wherein the intention reliability calculation means adjusts each weight, and calculates the reliability on the basis of the scores each given the adjusted weight.

7. The voice processing device according to claim 3, further comprising management means for managing an output based on the intention information selected by the intention selection means.

8. The voice processing device according to claim 1, wherein the score calculation means includes:
acoustic score calculation means for calculating an acoustic score as the score indicating an acoustic compatibility of the voice signal with intention information, for each of the plural pieces of intention information, the acoustic score calculating means including a grammar database including a concatenation probability of at least one of a bigram grammar or a trigram grammar.

9. The voice processing device according to claim 1, wherein each of the plural pieces of intention information corresponds to one or more example sentences, the example sentences of each intention information being used to generate a dictionary and a grammar rule for the intention information, and the dictionary and the grammar rule being used by the score calculation means for calculating the score corresponding to the intention information.

10. A voice processing method comprising the steps of:
calculating a score indicating compatibility of a voice signal input on the basis of an utterance of a user with each of plural pieces of intention information indicating each of a plurality of intentions;
calculating a pre-score, for each of the plural pieces of intention information, that specifies an occurrence probability for each of the plural pieces of intention information, the pre-score being calculated based on transitioning through a state transition model based on words of the utterance of the user, a plurality of states in the state transition model corresponding to a predetermined conversation, the words of the utterance of the user being a condition that results in the transitioning, the score being based on the pre-score;
selecting the intention information indicating the intention of the utterance of the user among the plural pieces of intention information on the basis of the score calculated by a process of the score calculation step; and
calculating the reliability of the intention information selected by a process of the intention selection step on the basis of the score calculated by the process of the score calculation step.

11. A non-transitory computer-readable storage medium having computer readable program codes embodied in the computer readable storage medium that, when executed cause a computer to execute:
calculating a score indicating compatibility of a voice signal input on the basis of an utterance of a user with each of plural pieces of intention information indicating each of a plurality of intentions;
calculating a pre-score, for each of the plural pieces of intention information, that specifies an occurrence probability for each of the plural pieces of intention information, the pre-score being calculated based on transitioning through a state transition model based on words of the utterance of the user, a plurality of states in the state transition model corresponding to a predetermined conversation, the words of the utterance of the user being a condition that results in the transitioning, the score being based on the pre-score;
selecting the intention information indicating the intention of the utterance of the user among the plural pieces of intention information on the basis of the calculated score; and
calculating the reliability of the intention information selected by a process of the intention selection step on the basis of the calculated score.

12. A voice processing device comprising:
at least one hardware processor;
a score calculation unit, implemented by the at least one hardware processor, configured to calculate a score indicating compatibility of a voice signal input on the basis of an utterance of a user with each of plural pieces of intention information indicating each of a plurality of intentions;
a pre-score calculation unit for calculating a pre-score, for each of the plural pieces of intention information, that specifies an occurrence probability for each of the plural pieces of intention information, the pre-score being calculated based on transitioning through a state transition model based on words of the utterance of the user, a plurality of states in the state transition model corresponding to a predetermined conversation, the words of the utterance of the user being a condition that results in the transitioning, the score being based on the pre-score;
an intention selection unit, implemented by the at least one hardware processor, configured to select the intention information indicating the intention of the utterance of the user among the plural pieces of intention information on the basis of the score calculated by the score calculation unit; and
an intention reliability calculation unit, implemented by the at least one hardware processor, configured to calculate the reliability of the intention information selected by the intention selection unit on the basis of the score calculated by the score calculation unit.

* * * * *